United States Patent [19]
Maruyama et al.

[11] Patent Number: 5,321,550
[45] Date of Patent: Jun. 14, 1994

[54] OPTICAL SYSTEM OF OPTICAL INFORMATION RECORDING/REPRODUCING APPARATUS

[75] Inventors: Koichi Maruyama; Makoto Iwaki, both of Tokyo, Japan

[73] Assignee: Asahi Kogaku Kogyo Kabushiki Kaisha, Tokyo, Japan

[21] Appl. No.: 5,187

[22] Filed: Jan. 14, 1993

Related U.S. Application Data

[63] Continuation of Ser. No. 477,464, Feb. 9, 1990, abandoned.

[30] Foreign Application Priority Data

Feb. 9, 1989 [JP] Japan .................................. 1-30775
Feb. 28, 1989 [JP] Japan .................................. 1-47590
Aug. 3, 1989 [JP] Japan .................................. 1-202558

[51] Int. Cl.$^5$ .......................... G02B 27/10; G02B 9/04
[52] U.S. Cl. ..................................... 359/618; 359/641;
359/793; 359/796; 369/44.39; 369/112
[58] Field of Search ................ 350/169, 247, 479–480,
350/482; 369/13, 110, 44.23, 112, 44.14, 44.17,
44.18, 44.21–44.23, 44.39; 346/108; 250/201.5,
202, 112, 121; 359/793–796, 754–786, 784, 797,
618, 641, 629, 813–814, 823–824

[56] References Cited

U.S. PATENT DOCUMENTS

| | | | |
|---|---|---|---|
| 4,484,803 | 11/1984 | Arai ...................................... | 350/480 |
| 4,557,564 | 12/1985 | Rosmalen ............................ | 350/247 |
| 4,572,623 | 2/1986 | Tanaka et al. ....................... | 350/480 |
| 4,721,373 | 1/1988 | Sugiyama ............................ | 350/482 |
| 4,753,524 | 6/1988 | Sugiyama ............................ | 350/480 |
| 4,791,625 | 12/1988 | Nakamura .......................... | 369/44.23 |
| 4,909,616 | 3/1990 | Arai ..................................... | 359/708 |
| 4,976,526 | 12/1990 | Oshima et al. ...................... | 359/737 |

FOREIGN PATENT DOCUMENTS

| | | |
|---|---|---|
| 123048 | 10/1984 | European Pat. Off. . |
| 3237645 | 5/1983 | Fed. Rep. of Germany . |
| 58-72114 | 4/1983 | Japan . |
| 59-0743 | 4/1984 | Japan . |
| 60-232519 | 11/1985 | Japan . |
| 62-267933 | 11/1987 | Japan . |
| 62-269922 | 11/1987 | Japan . |
| 63-10118 | 1/1988 | Japan . |
| 63-20735 | 1/1988 | Japan . |
| 62-35311 | 1/1988 | Japan . |

OTHER PUBLICATIONS

"Single Lens CD Player Pickup System Using a Bi-aspheric Molded Glass Lens" (Sunohara et al.), I.E.E.E. Transactions on Consumer Electronics, vol. CE-33, No. 4, pp. 520–530, Nov. 1987, New York, N.Y.

*Primary Examiner*—Loha Ben
*Assistant Examiner*—James Phan
*Attorney, Agent, or Firm*—Sandler Greenblum & Bernstein

[57] ABSTRACT

An optical system of an optical information recording/reproducing apparatus including a light source for emitting a generally parallel luminous flux; an objective optical system for converging the luminous flux emitted from the light source onto a medium; a beam splitter for splitting the luminous flux reflected by the medium from a light path directed to the light source and guiding the same to a light receiving system; a chromatic aberration correcting element having almost no power disposed between the objective lens and the beam splitter and adapted to correct a chromatic aberration of the objective lens; and means for independently actuating the objective lens at least in an optical axis direction thereof.

16 Claims, 46 Drawing Sheets

OPTICAL SYSTEM OF OPTICAL INFORMATION RECORDING/REPRODUCING APPARATUS

This application is a continuation of application Ser. No. 07/477,464, filed Feb. 9, 1990, now abandoned.

BACKGROUND OF THE INVENTION

1. Field of the Invention

This invention relates to an optical system of an optical information recording/reproducing apparatus in which a semiconductor laser is used as a light source, and further relates an objective optical system and a chromatic aberration correcting element suitable to the optical system.

2. Description of the Prior Art

An optical system of an optical information recording/reproducing apparatus such as optical disk apparatus, etc. comprises, as generally shown in FIG. 52, a light source portion 10 for emitting a generally parallel luminous flux, an objective optical system 20 for converging (focusing) the luminous flux emitted from the light source 10 onto an optical disk OD, a beam splitter 30 for splitting the luminous flux disposed between the light source 10 and the objective optical system 20 and adapted to split the luminous flux reflected by the disk, and a signal detecting optical system 40 for receiving such split luminous flux.

The light source portion 10 has a semiconductor laser 11, a collimator lens 12, and a beam shaping element 13.

The objective optical system 20 includes an objective lens 21, and a mirror 22, and disposed within a head 50 which is slided in the radial direction of the optical disk. Also, the objective lens 21 is mounted on an actuator (not shown) disposed within the head 50 and designed such that the objective lens 21 can be finely moved at least in the optical axis direction thereof so that a out of focus caused by warping of the disk, etc. can be corrected.

The signal detecting optical system 40 has a beam splitter 41, a tracking signal detecting system 42, and a focusing signal detecting system 43, and is adapted to reads information recorded in the disk and error signals of the trucks by reflected light from an optical disk OD.

By the way, an emitting light wavelength of the semiconductor laser used as a light source is shifted by changing of output power power and/or temperature. Because of the foregoing reason, when the chromatic aberration of the optical system is not corrected yet, the position of a light converging point is varied by shifting the wavelength.

When the light converging position is not coincident with the recording surface of the disk, there is a high possibility that incorrect writing and reading are effected.

However, out of focus due to comparatively gentle change of a wavelength caused by change of temperature or the like is automatically corrected by the aforementioned focusing servo when the collimator lens is corrected in chromatic aberration and change of temperature.

However, at the time when a data is written, an oscillation wavelength of a semiconductor laser is instantaneously shifted by several nm between a region where the temperature is increased and a region where the temperature is not increased. And the out of focus caused by such radical shift cannot be corrected by the above-mentioned focusing servo.

Therefore, especially when writing is effected, correction of the chromatic aberration of the objective optical system is important.

An optical system in which the objective lens itself is corrected in chromatic aberration is disclosed in, for example, Japanese Patent Early Laid-open Publication No. Sho 63-10118, Japanese Patent Early Laid-open Publication No. Sho 60-232519 and Japanese Patent Early Laid-open Publication No. Sho 58-72114.

However, the lens of the Japanese Patent Early Laid-open Publication No. Sho 63-10118 is of three pieces structure including an aspherical lens, while the lenses of the Japanese Patent Early Laid-open Publication No. Sho 60-232519 and the Japanese Patent Early Laid-open Publication No. Sho 58-72114 are of four pieces structure of glass lenses. Accordingly, there are such problems as that these lenses are heavy in weight compared with lenses which are not corrected in chromatic aberration, and a load incurred to a movable actuator is large.

As an objective lens for an optical disk apparatus is moved at a high frequency for the purposes of focusing and trucking, it is strongly demanded that the objective lens is made compact in size and light in weight in order to reduce the burden to the actuator.

Also, Japanese Patent Early Laid-open Publication No. Sho 62-269922 discloses an optical system for correcting the chromatic aberration of an objective lens by excessively correcting the chromatic aberration of a collimator lens. With this construction, it is necessary to excessively correct even a focusing error detecting optical system because otherwise out of focus is generated caused by a focusing servo.

However, the correcting amount of the chromatic aberration of the focusing error detecting optical system is proportional to a second raised power of the ratio M between a focal length of a condenser lens of this optical system and a focal length of the objective lens. Therefore, in an ordinary optical disk apparatus taking a value of about M=10 in view of the size of a light receiving element, it is difficult to design as such that the condenser lens has a sufficient correcting amount of chromatic aberration.

SUMMARY OF THE INVENTION

This invention has been accomplished in order to solve the above-mentioned problems.

An optical system of an optical information recording/reproducing apparatus according to the present invention comprises a light source portion for emitting a generally parallel luminous flux, an objective optical system for converging the luminous flux emitted from the light source onto a medium, and a beam splitter for splitting the luminous flux reflected by the medium from a light path directed to the light source portion and guiding the same to a light receiving system, said objective optical system including an objective lens having a positive power and independently driven at least for focusing and a chromatic aberration correcting element having almost no power and disposed between the objective lens and the beam splitter in order to correct the chromatic aberration of the objective lens.

Regarding aberration other than chromatic aberration, it is desirable that the objective lens and the chromatic aberration correcting element are corrected independently. The reason is that if it is constructed in such a manner as that the aberration is offset by the objective lens and the chromatic aberration correcting element, an aberration is generated when a relative position is changed by trucking and/or focusing.

The chromatic aberration correcting element is constructed of a combination of a positive lens with a negative lens having a different Abbe number in order to correct chromatic aberration. In order to increase the corrected amount of the chromatic aberration, it is desirable that these lenses are cemented with each other. The reason is that if a spatial distance exists between the positive lens and the negative lens, a total reflection is occurred at the peripheral portion thereby to generate an eclipse, and an aberration fluctuation is occurred when a distance error is taken place.

DETAILED DESCRIPTION OF THE EMBODIMENTS

The embodiment of the present invention will now be described hereinafter with reference to the drawings. The order of the description is as follow.

(1) Example of the construction of a whole optical system of an optical information recording/reproducing apparatus
(2) Concrete example of an objective lens
(3) Concrete examples of an objective optical system Ex. 1 to Ex. 12

(1) The construction of a whole optical system of an optical information recording and reproducing apparatus

Example 1

Figure 1:
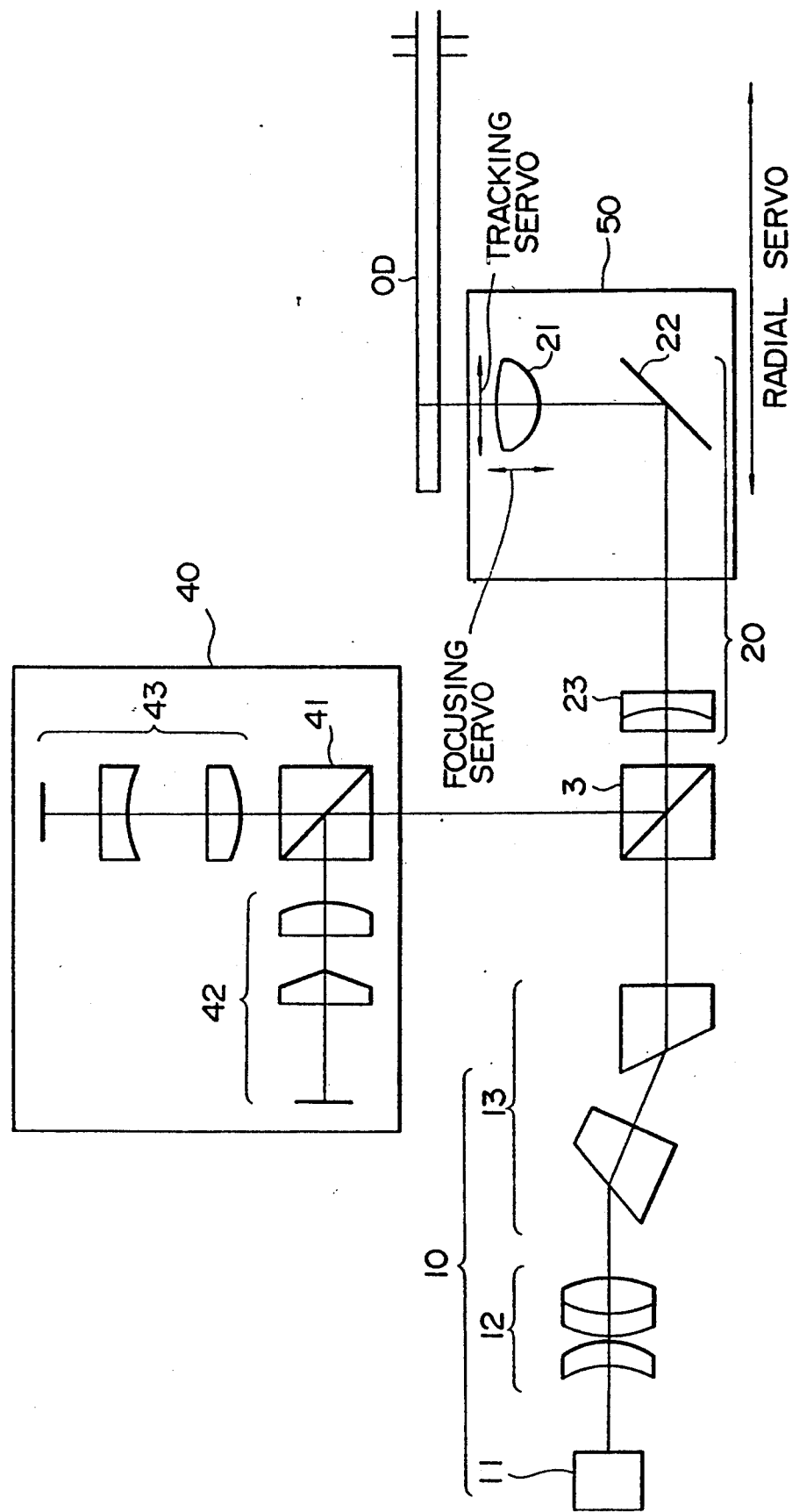
FIG. 1 is a light path diagram showing a first embodiment of an optical information recording/reproducing apparatus according to the present invention.

FIG. 1 shows EXAMPLE 1 of an optical system of an optical information recording/reproducing apparatus.

This optical system includes a light source 10, an objective optical system 20, a beam splitter 30, and a signal detecting optical system 40. The light source 10 comprises a semiconductor laser 11 for generating a divergent luminous flux, a collimator lens 12 for collimating the divergent luminous flux, a beam shaping optical system 13 for shaping the sectional configuration of the luminous flux, thereby to generate a parallel beam of a circular shape in section.

The objective optical system 20 includes an objective lens 21 for converging beam onto the recording surface of the optical disk OD, a mirror 22, a chromatic aberration correcting element 23 for correcting the movement of the light converged position caused by wavelength shift of the semiconductor laser 11. The objective lens 21 and the mirror 22 are disposed within a head 50 which is slided in the radial direction of the optical disk. The chromatic aberration correcting element comprises a positive lens and a negative lens cemented together and is fixed to the outside of the head 50. Also, the objective lens 21 is mounted on an actuator (not shown) which is disposed within the head 50 and can be finely moved in the optical axis direction thereof and the radial direction of the disk.

The diameter of the luminous flux, which transmits through the chromatic aberration correcting element 23, is preferably set to be larger than the diameter of the objective lens 21. Because, a sufficient luminous flux can be made incident to the objective lens 21 even when the objective lens 21 independently moved by tracking.

Both the head 50 and the objective lens 21 are actuated in the radial direction of the disk. The actuation of the head 50 is a coarse actuation (radial servo) crossing the track, while the actuation of the objective lens 21 is a fine actuation (tracking servo) having a high frequency.

The signal detecting optical system 40 has a beam splitter 41, a tracking signal detecting system 42, and a focusing signal detecting system 43 and reads the information recorded in the disk as well as respective error signals of the focus and track by the reflected light from the optical disk OD.

The actuator provided with the objective lens 21 applies a focusing servo in order to correct a out of focus caused by warping of the disk in accordance with the focus error signal and applies a tracking servo so that the spot which is converged by the objective lens 21 would not be brought out of the track in accordance with the track error signal.

The tracking servo may employ, besides the method for actuating the objective lens 21 as mentioned above, a method for actuating the mirror 22 or the entire head 50 at a high frequency.

Figure 2:
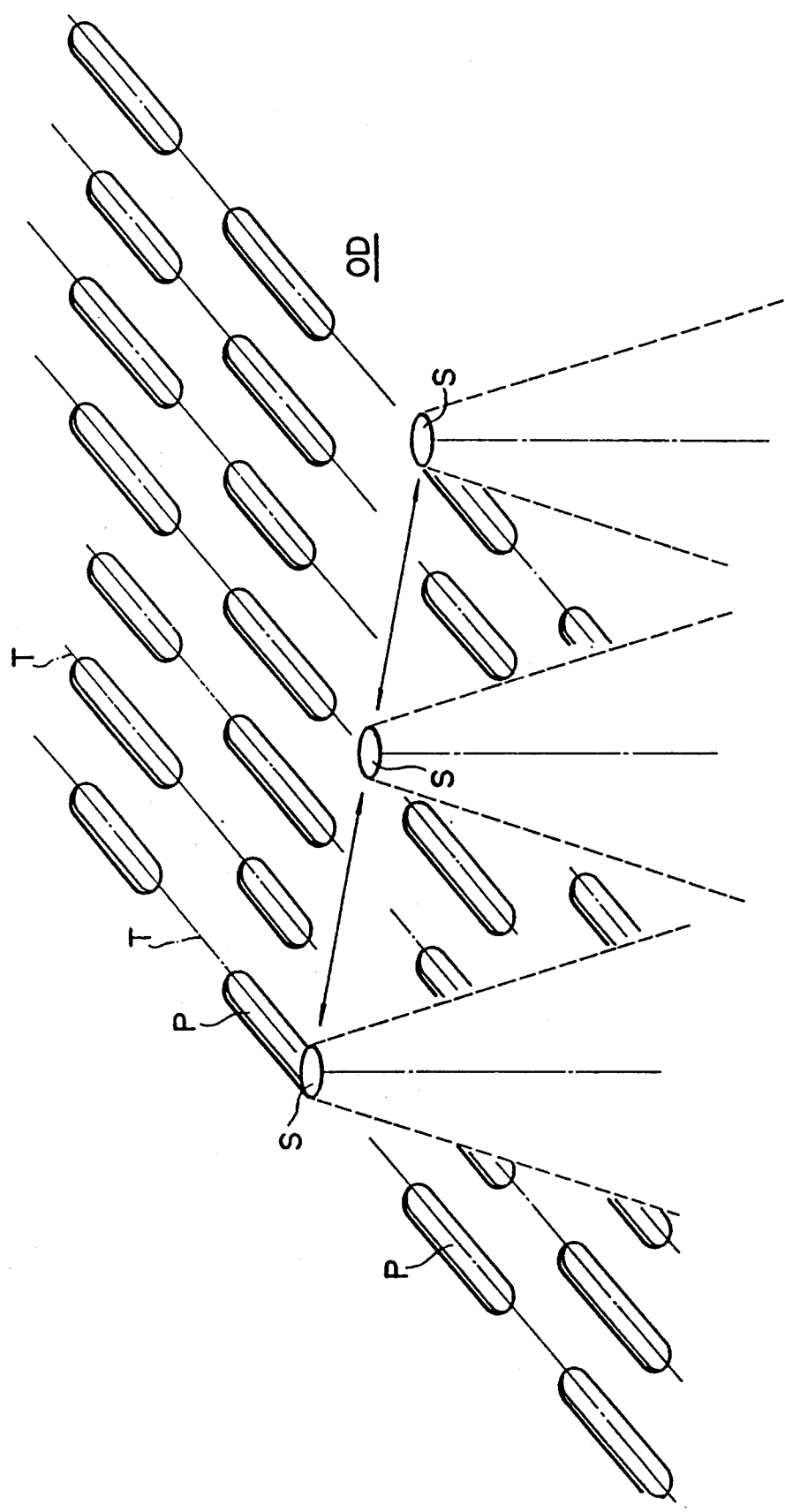
FIG. 2 is a diagram showing the operation of a tracking servo and a radial servo.

FIG. 2 is a diagram for explaining differences between the radial servo and the tracking servo taking a reproducing optical disk as one example. A track T shown by one-dotted chain line is formed in a spiral or concentic shape on the optical disk OD, and a pit P is formed on the track T. The radial servo is a control means for moving a spot S converged by the objective lens across the track T as shown in the arrow in the drawing. On the other hand, the tracking servo is a control means for moving a spot S tracing on the track T within a fine range so that the spot S would not be brought out of the track.

Figure 3:
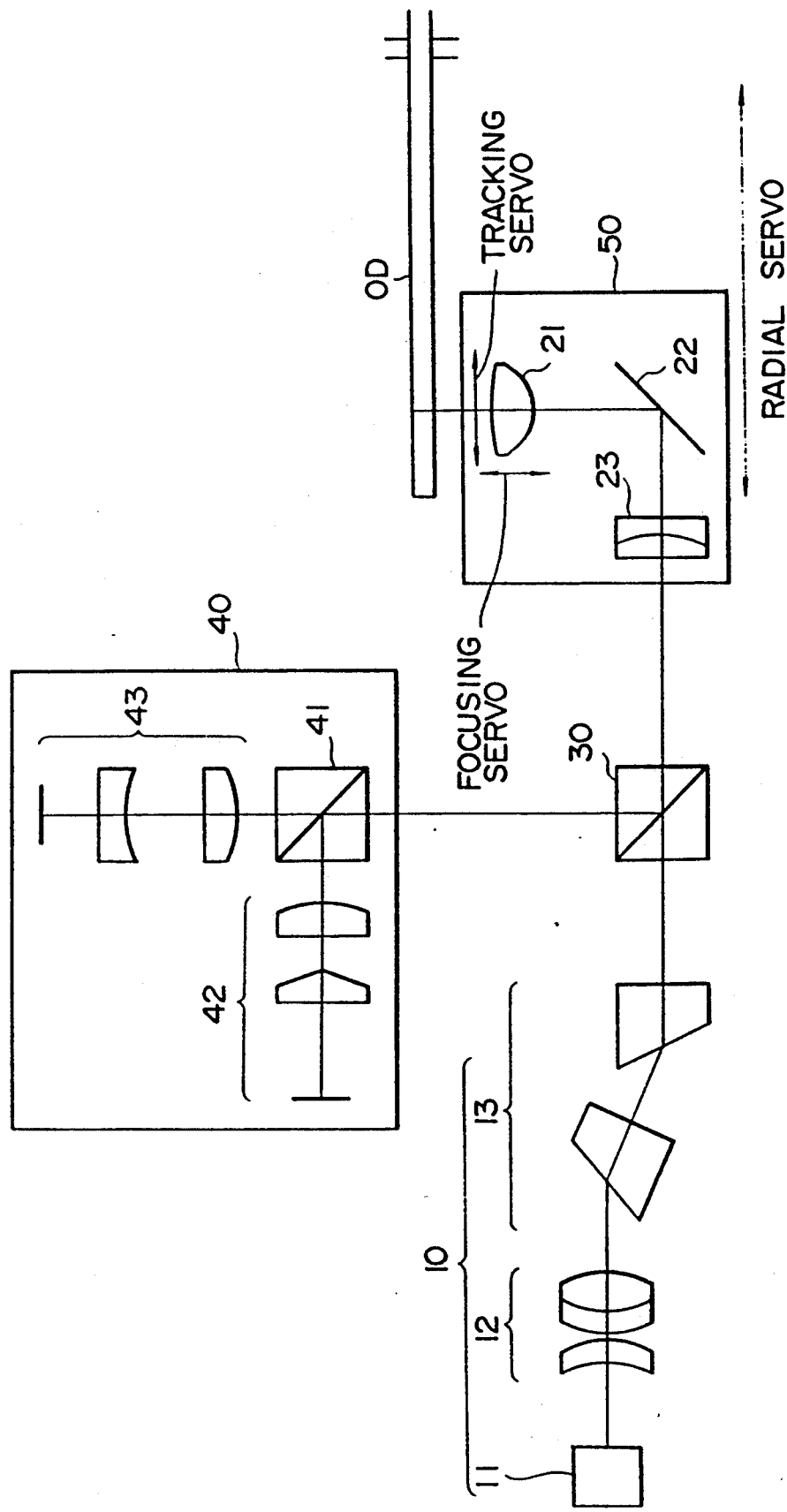
FIG. 3 is a light path diagram showing a second embodiment of an optical system of an optical information recording/reproducing apparatus according to the present invention.

The chromatic aberration correcting element 23, as shown in FIG. 3, may be disposed within the head 50 as shown in FIG. 3.

When the chromatic aberration correcting element 23 is disposed outside the head, the head can be miniaturized. On the other hand, when the chromatic aberration correcting element is disposed within the head, the effective aperture of the chromatic aberration correcting element can be made smaller than the case where the chromatic aberration correcting element is disposed outside the head because no positional displacement of an incident pupil caused by the radial servo is occurred.

Example 2

Figure 4:
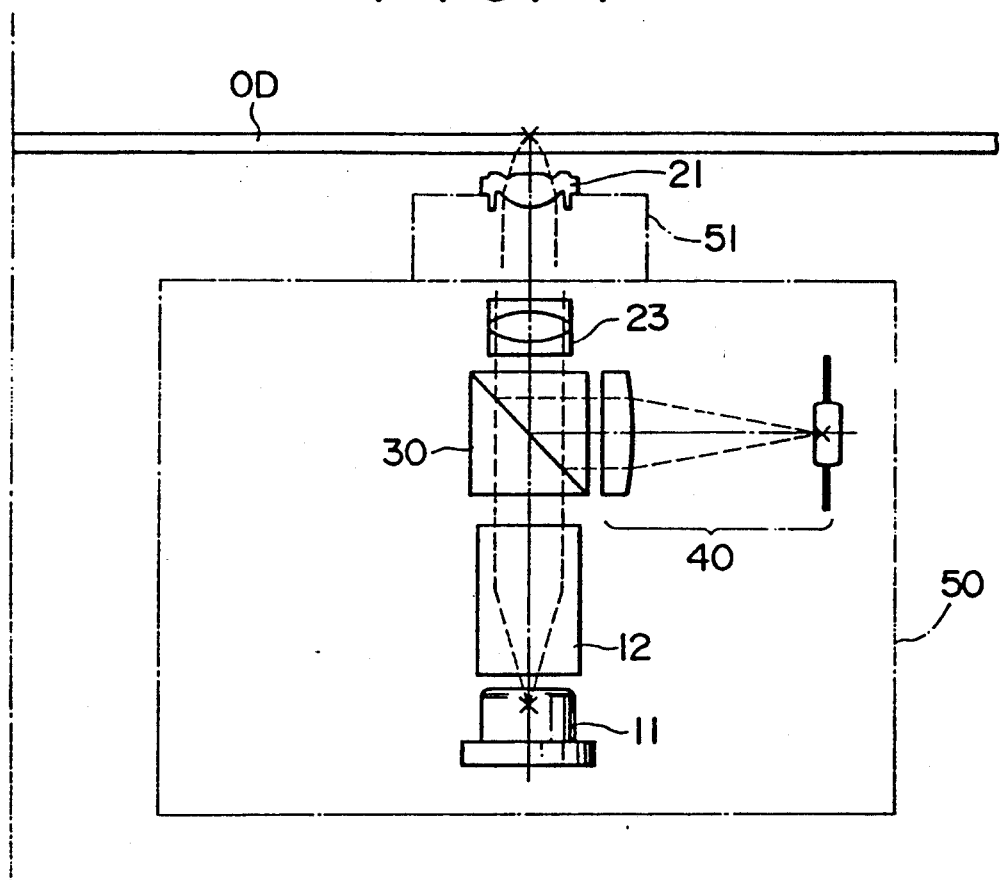
FIG. 4 is a light path diagram showing a third embodiment of an optical system of an optical information recording/reproducing apparatus according to the present invention.

FIG. 4 shows the second embodiment of an optical system of an optical information recording/reproducing apparatus.

This optical system is designed such that the semiconductor laser 11, the collimator lens 12, the beam splitter 30, the objective lens 21, the chromatic aberration correcting element 23, and the signal detecting optical system 40 are all disposed within the head 50 which is slided in the radial direction of the disk.

The objective lens 21 is disposed on an actuator 51 and is capable of finely moving in the optical axis direction thereof and the radial direction of the disk.

The chromatic aberration element 23 comprises two negative lenses and one positive lens cemented together.

(2) Objective Lens

Figure 5:
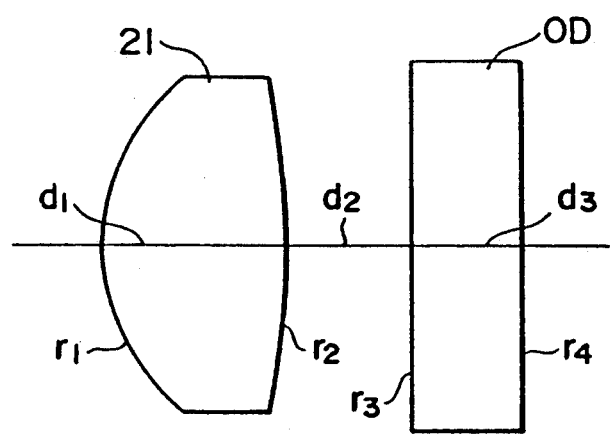
FIG. 5 is a lens diagram showing a concrete example of an objective lens.
Figure 6:
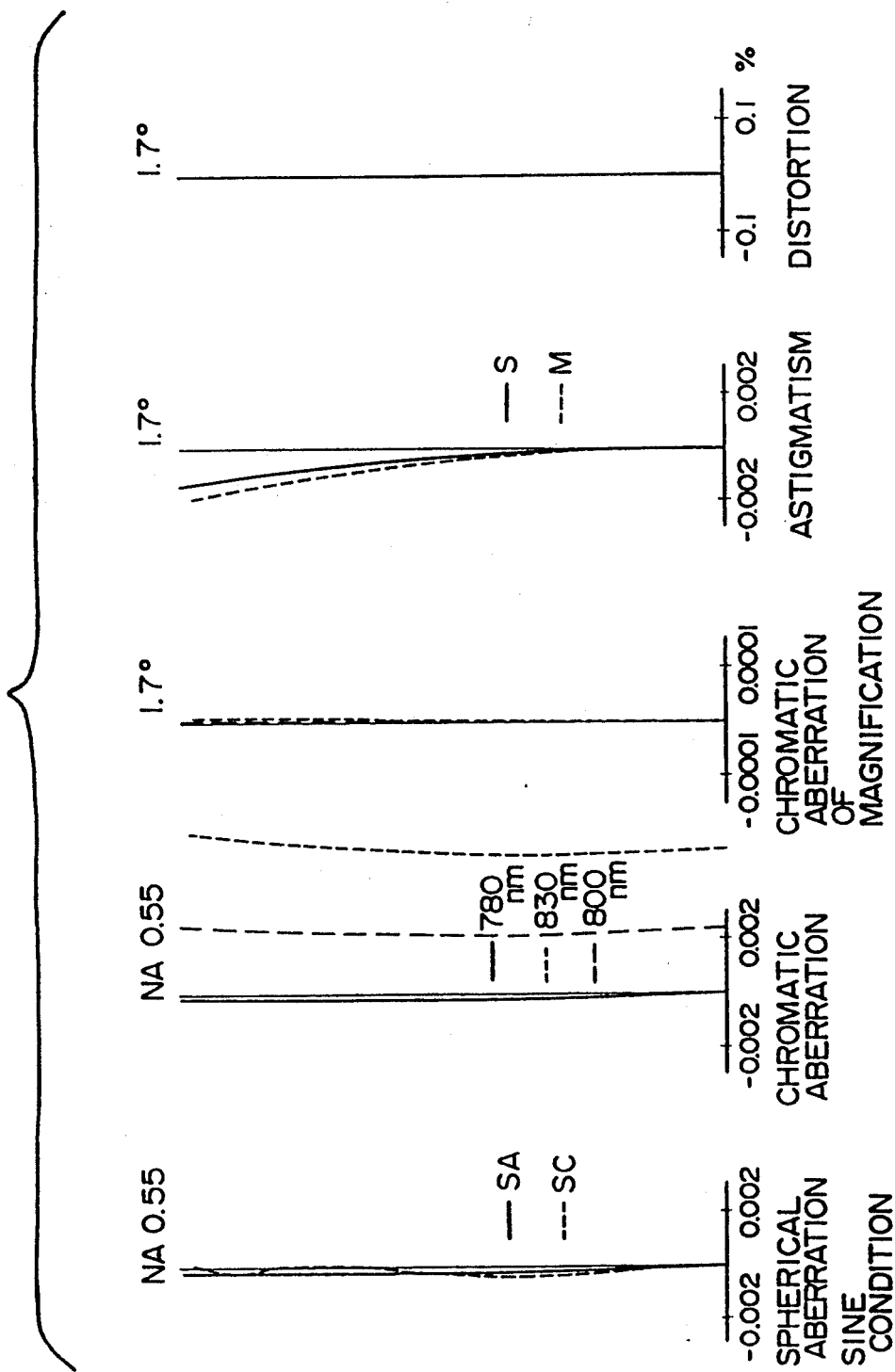
FIG. 6 are various aberration diagrams of the objective lens shown in FIG. 5.
Figure 7:
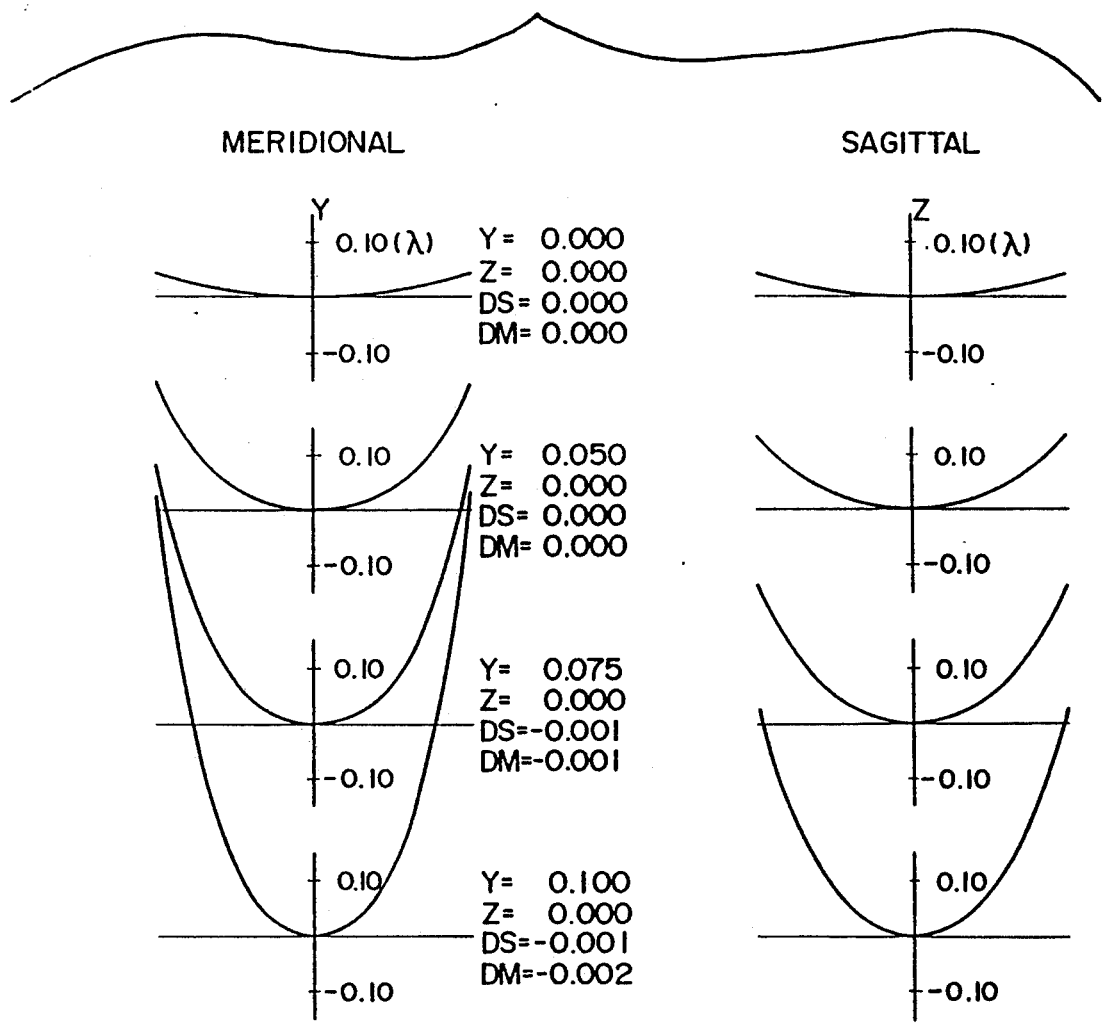
FIG. 7 are wave aberration diagrams of the objective lens shown in FIG. 5.

FIG. 5 shows the above-mentioned objective lens, and FIGS. 6 and 7 show the aberration of the single unit of the objective lens. The reference character OD in FIG. 5 denotes a cover glass for covering the recording surface of the disk.

The objective lens of the optical disk apparatus is indispensable to have a convex surface in order to exhibit a strong converging force for converging the luminous flux to the recording surface of the disk. And in order to maintain the converging efficiency high, it is necessary to fully correct the spherical aberration and the coma aberration.

In order to restrain the coma aberration, it is necessary to satisfy the sine condition. To this end, it is necessary to provide a strong convex converging surface on the light source side. This strong converging surface is preferably disposed near the disk in order to obtain a working distance.

This objective lens is formed into an aspherical lens having a larger radius of curvature as it goes toward the peripheral portion thereof in order to correct the spherical aberration and the coma aberration by a single piece of lens and also in order to obtain a sufficient edge thickness necessary for processing while restraining the central thickness thereof.

Concrete numerical constructions are as shown in Table 1 and Table 2. In the Tables, the reference character r the radius of curvature of a surface, d a lens thickness or a spatial distance, $n_{780}$ a refractive index in a wavelength of 780 nm of a lens, $n_d$ a refractive index in a d-line (wavelength of 588 nm) of a lens, and $\nu_d$ an Abbe number. The surface No. 1 and 2 denotes the objective lens and the surface No. 3 and 4 denotes the cover glass of the optical disk. Regarding the glass material, the objective lens is a polymethylmethacrylate and the cover glass OD of the optical desk is BK7.

The aspherical first and second surfaces are expressed as follows;

$$X = \frac{CY^2}{1 + \sqrt{1 - (1 + K)C^2 Y^2}} + A_4 Y^4 + A_6 Y^6 + A_8 Y^8 + A_{10} Y^{10} + A_{12} Y^{12}$$

wherein X is a distance from a tangential plane of the vertex of an aspherical surface on the aspherical surface where the height Y from the optical axis, C is the radius of curvature (1/r) of the vertex of the aspherical surface, K is the coefficient of a circular cone, and the $A_4 \sim A_{10}$ are aspherical surfaces coefficients. These coefficients are as shown in Table 2.

TABLE 1

| surface NO. | r | d | $n_{780}$ | $n_d$ | $\nu_d$ |
|---|---|---|---|---|---|
| 1 | 2.005 | 2.080 | 1.48479 | 1.49186 | 57.4 |
| 2 | −5.231 | 1.390 | | | |
| 3 | ∞ | 1.200 | 1.51072 | 1.51633 | 64.1 |
| 4 | ∞ | | | | |

TABLE 2

| first surface | second surface |
|---|---|
| K = −0.5223E + 00 | K = −0.3168E + 01 |
| $A_4$ = −0.1400E − 03 | $A_4$ = 0.1740E − 01 |
| $A_6$ = −0.4966E − 04 | $A_6$ = −0.4011E − 02 |
| $A_8$ = 0.1654E − 04 | $A_8$ = 0.5593E − 03 |
| $A_{10}$ = −0.1292E − 04 | $A_{10}$ = −0.3494E − 04 |
| $A_{12}$ = 0.0000E + 00 | $A_{12}$ = 0.0000E + 00 |

(3) Concrete example of objective optical system

Figure 8:
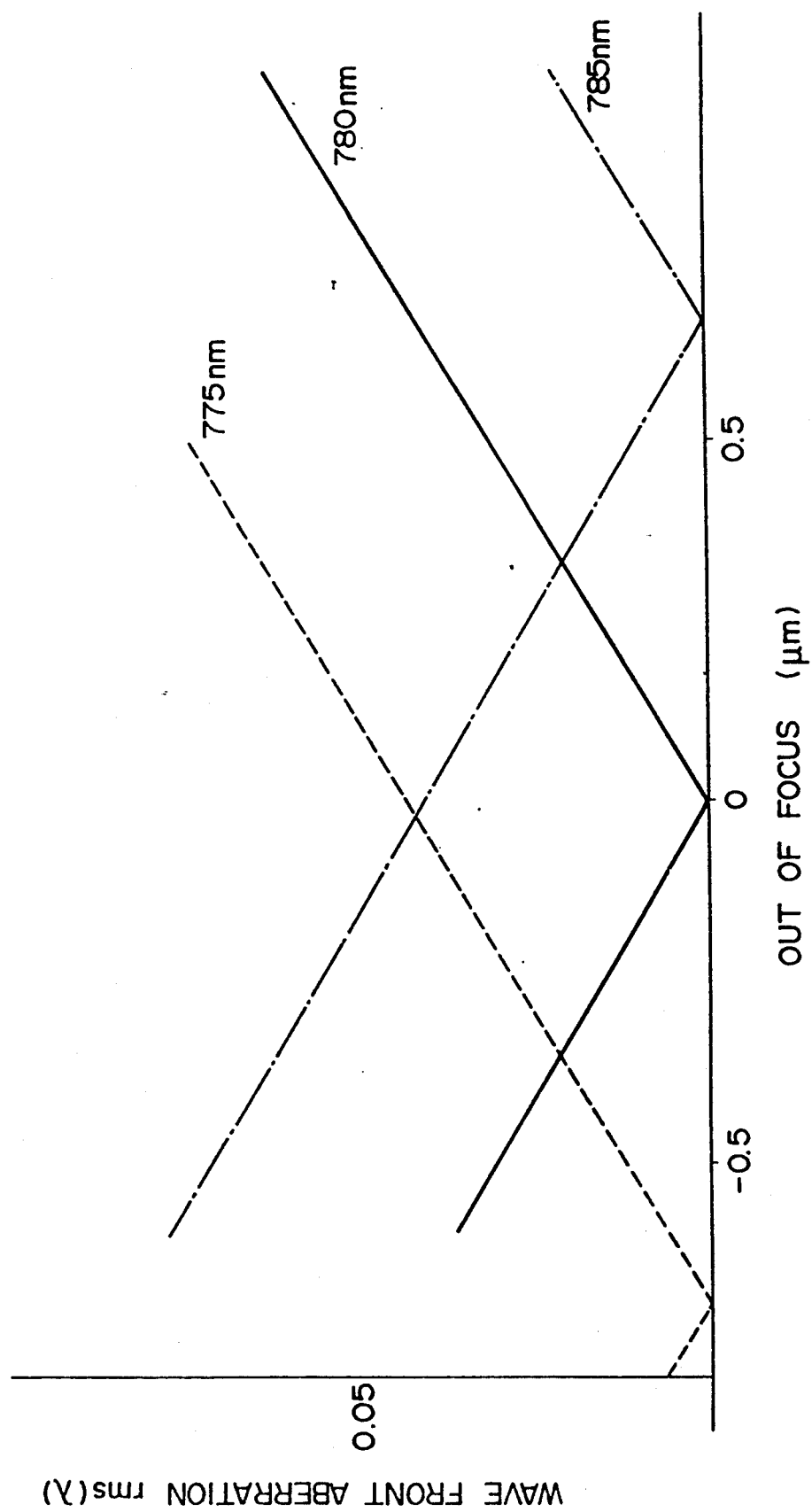
FIG. 8 is a graph showing the movement of a light converged position caused by wavelength fluctuation of the lens shown in FIG. 5.

Deterioration of wave aberration based on the out of focus of the single body of the objective lens is as shown in FIG. 8. It will be understood from FIG. 8 that when the wavelength is shifted by 5 nm, a wave aberration of about 0.04λ is generated. In order to maintain the efficiency as an objective lens, the limit of the wave aberration is about 0.05λ. Actually, however, as there exists out of focus based on factors other than the chromatic aberration, there is a possibility that the above limit is exceeded by shift of the wavelength of about 5 nm.

It is the chromatic aberration correcting element which corrects the out of focus of the objective lens caused by such wavelength fluctuation as mentioned above.

It is necessary for the chromatic aberration correcting element to be changed in power with respect to the change in wavelength in the direction for offsetting the change of power caused by the wavelength fluctuation of the objective lens.

In general, a lens using refraction which is not corrected in chromatic aberration takes a negative value in power change ratio $\Delta\phi/\Delta\lambda$ ($\Delta\phi$: change of power, $\Delta\lambda$: shift of wavelength). Accordingly, the chromatic aberration correcting element is necessary that $\Delta\phi/\Delta\lambda$ takes a positive value.

The chromatic aberration correcting element is required to have almost no power so that the aberration would not be changed due to change in relative position between the chromatic aberration correcting element and the objective lens in the optical axis direction.

Also, in order to eliminate the fluctuation in aberration due to displacement toward outside the optical axis of the chromatic aberration correcting element and the objective lens, it is required to have almost no spherical aberration. The displacement is occurred due to, for example, positional error when mounting, horizontal displacement when focusing, tracking, etc.

When these conditions are satisfied, there can be finally constructed an objective optical system having no chromatic aberration even if the chromatic aberration correcting element is disposed to any position between the objective lens and the beam splitter.

In order to satisfy the above requirements, the chromatic aberration correcting elements shown in the following embodiments satisfy the conditions set forth hereunder.

| | |
|---|---|
| $\|n_p - n_n\| \times 10^5 < 300$ | ... (1) |
| $(n_{p780} - 1)(1 - \nu_{n780}/\nu_{p780}) > 0.2$ | ... (2) |
| $(\Delta n_p/\Delta \lambda - \Delta n_n/\Delta \lambda) \times \lambda^2 > 9.0$ nm | ... (3) |
| $\|f_p/f_c\| < 0.01$ | ... (4) |
| $\|r_a/r_m\| > 5$ | ... (5) |
| $\|r_1/f\| > 7$ | ... (6) |
| $\|r_3/f\| > 7$ | ... (7) |

However, the symbolic characters used in the relations have the following meanings.

$n_p$: refractive index of a positive lens in center use wavelength λ

$n_n$: refractive index of a negative lens in center use wavelength λ

$n_{n780}$, $n_{n830}$: refractive indexes in wavelengths 780 nm, 830 nm $n_{p780}$, $n_{p830}$: refractive indexed in wavelengths 780 nm, 830 nm $\nu_{n780}$: dispersion of a negative lens in the vicinity of wavelength 780 nm wherein;
$\nu_{n780} = n_{n780}/(n_{n780} - n_{n830})$ $\nu_{p780}$: dispersion of a positive lens in the vicinity of wavelength 780 nm wherein;
$\nu_{p780} = n_{p780}/(n_{p780} - n_{p830})$ $\Delta n_p/\Delta\lambda$: gradient with respect to wavelength of a refractive index of a positive lens $\Delta n_n/\Delta\lambda$: gradient with respect to wavelength of a refractive index of a negative lens $f_p$: focal length of a positive lens $f_c$: focal length in its entirety $r_m$: radius of curvature of cemented surfaces $r_a$: radius of curvature of noncemented surfaces of a positive lens $r_1$: radius of curvature of incident surface $r_3$: radius of curvature of outgoing surface f: focal length of whole objective optical system Regarding the chromatic aberration correcting element, the smaller the radius of curvature of the cemented surfaces is and the larger the difference in positive and negative refractive indexes is, the more significant the generation of the aberration becomes. As the element itself does not have power, when the aberration is generated in the cemented surface, it is difficult to correct the aberration within the element. Accordingly, it becomes necessary to restrict the generation of aberration at the cemented surfaces as much as possible.

In order to generates the aberration, there are means for making the radius of curvature large and means for making the difference in refractive indexes small. However, when the cemented surfaces are brought very close to a surface, the original function as to correct the chromatic aberration cannot be exhibited. Accordingly, there is a limit in reduction of the aberration caused by the former means. On the contrary, when the refractive indexes are made almost equal, the generation of the spherical aberration and the coma aberration can be restrained even when the radius of curvature becomes considerably. By differentiating the dispersion, it becomes possible to apply a change in chromatic aberration.

The relation (1) shows the condition for restraining the difference of refractive index of positive and negative lenses of the chromatic aberration correcting element and reducing the generation of other aberrations than the chromatic aberration as much as possible.

However, even in the case that the condition of the relation (1) is satisfied, it is desirable that the radius of curvature of the cemented surfaces is as large as possible. The reason is that when the radius of curvature of the cemented surfaces is small, the thickness of the whole chromatic aberration correcting element becomes large in order to obtain the edge thickness of the positive lens, while when a lens having a large numerical aperture (NA) is used, a spherical aberration of a higher order is generated. Therefore, the chromatic aberration correcting element is necessary to be formed of a combination of materials capable of increasing the radius of curvature of the cemented surfaces as much as possible but within a limit able to exhibit a chromatic aberration correcting effect.

The relation (2) shows the condition for regulating the dispersion of quality of a chromatic aberration correcting element in order to satisfy the chromatic aberration correcting effect when a semiconductor laser which emits a near infrared radiation (780 nm to 830 nm) is used. In case this condition is not satisfied, even if an objective lens having the smallest dispersion CaFK95 (Merchandise Name: Sumida Kogaku) among raw materials for the use of an aspherical lens obtainable at present, the chromatic aberration correcting element becomes too thick in order to sufficiently correct the chromatic aberration, thus resulting in a problem in respect of weight or space.

In general, if the border surface of a medium having a different refractive index is a curved surface, this border surface has power. Also, in case the chromatic aberration is not corrected, the power of the border surface is changed in accordance with the variation of the wavelength. The Variation $\Delta\phi/\Delta\lambda$ of the power of the cemented surfaces caused by the fluctuation of the wavelength is given by the following relation:

$$\Delta\phi/\Delta\lambda = (1/r_m)\{(\Delta n_p/\Delta\lambda) - (\Delta n_n/\Delta\lambda)\}$$

As the chromatic aberration amount CA of the objective lens which is not corrected in chromatic aberration is proportional to about $\lambda^{-2}$, also $\Delta\phi/\Delta\lambda$ of the chromatic aberration correcting element is desirous to be proportional to $\lambda^{-2}$.

Accordingly, $(\Delta n_p/\Delta\lambda - \Delta n_n/\Delta\lambda) \times \lambda^2$ becomes a value showing the chromatic aberration correcting effect of the chromatic aberration correcting element.

The relation (3) stipulates a combination of materials of the chromatic aberration correcting element for satisfying the above-mentioned chromatic aberration correcting effect. In case the condition of the relation (3) is not satisfied, even if the chromatic aberration is corrected by somehow strengthening the curvature of the cemented surfaces, compatibility of the sufficient chromatic aberration correction of the objective lens and the prevention of other aberration deterioration becomes impossible because the convergence on the cemented surfaces occurred when the wavelength change is generated or the change of dispersing degree becomes too large.

Take an optical glass of Kabushiki Kaisha Ohara for example. There are the following combinations of glasses which satisfy the conditions of the relations (1) and (3) at the wavelength of, for example, 780 nm.

| lens | lens | (1) | (3) |
|------|------|-----|-----|
| LaSK01 | SFS5 | 85.0 | 13.7 |
| LaK09 | SF13 | 16.6 | 12.5 |
| LaK13 | SF15 | 24.8 | 10.2 |
| LaK08 | SF15 | −0.6 | 10.1 |

The relation (4) determines a ratio between the focal length $f_c$ of the chromatic aberration correcting element and the focal length $f_p$ of a positive lens of the chromatic aberration correcting element. When this condition is not satisfied, if a chromatic aberration correcting amount is sufficiently provided, an apparent light source position when looked from the objective lens is greatly changed depending on whether the chromatic aberration correcting element is provided. Therefore, it is necessary to separately design the objective lens depending on whether the chromatic aberration correcting element is provided. In the case the chromatic aberration correcting element and the objective lens are not arranged in proximate with each other, the working distance becomes difficult to obtain when the ratio exceeds 0.01, while a large size of the objective lens is invited when the ratio is smaller than −0.01.

It is desirous that the incident surface and the outgoing surface of the chromatic aberration correcting element have almost no power. However, the incident and outgoing surfaces are not necessarily formed into a perfect plane respectively. In the case that these surfaces have a curvature, the surface reflected light of the chromatic aberration correcting element does not become a return light to the semiconductor laser. This is effective in preventing the signal from be adversely affected.

The relation (5) stipulates the radius of curvature of the cemented surface and the non-cemented surface of the positive lens in view of the above. The relations (6) and (7) stipulate the ratio between the radius of curvature of the both surfaces of the chromatic aberration correcting element and the focal length. When these conditions are not satisfied, the power of the incident and outgoing surfaces becomes large. As a result, an aberration is easy to occur due to failing when arranged. Even if the total power is 0, it has an angle magnification. As a result, increase of the diameter of the lens and reduce of the working distance are invited.

Next, examples of concrete numerical constructions of the objective optical system including a chromatic aberration correcting element will be described. In the drawing, an objective optical system formed of a combination of the chromatic aberration correcting element with the objective lens is shown. The aberration is for the whole objective optical system.

EXAMPLE 1

Figure 9:
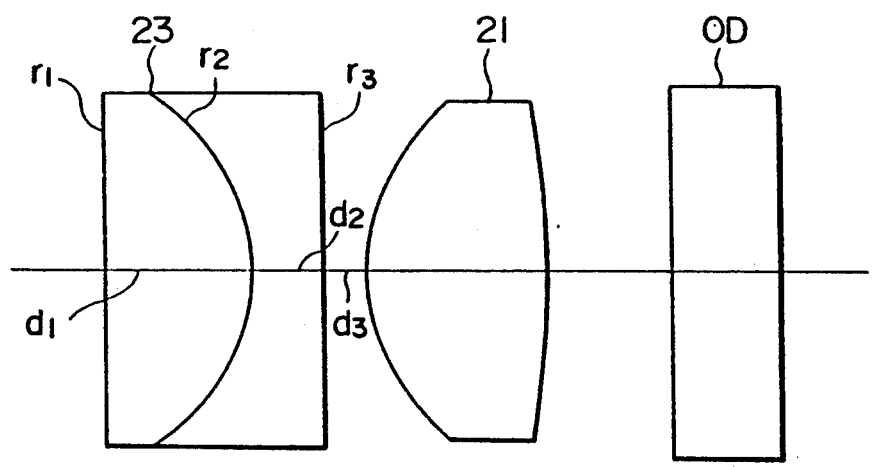
FIG. 9 is a lens diagram showing EXAMPLE 1 of an objective optical system.

FIG. 9 shows EXAMPLE 1 of an objective optical system. The numerical construction of the chromatic aberration correcting element is shown in Table 3. In the table, the reference character NA denotes the numerical aperture, f denotes a focal length of the objective optical system in a wavelength of 780 nm, $\omega$ denotes a half field angle. As the numerical value constructions for the objective lens and the cover glass of the optical disk is the same to that of EXAMPLE 1, description will be omitted in the following Table.

TABLE 3

| surface NO. | r | d | $n_{780}$ | $n_d$ | $v_{780}$ | glass material name |
|---|---|---|---|---|---|---|
| | NA 0.55 | f = 3.30 | $\omega$ = 1.7° | | | |
| 1 | $\infty$ | 1.600 | 1.72437 | 1.73400 | 1071 | LaK09 |
| 2 | −2.200 | 0.800 | 1.72421 | 1.74077 | 684 | SF13 |
| 3 | $\infty$ | 0.500 | | | | |

Figure 10:
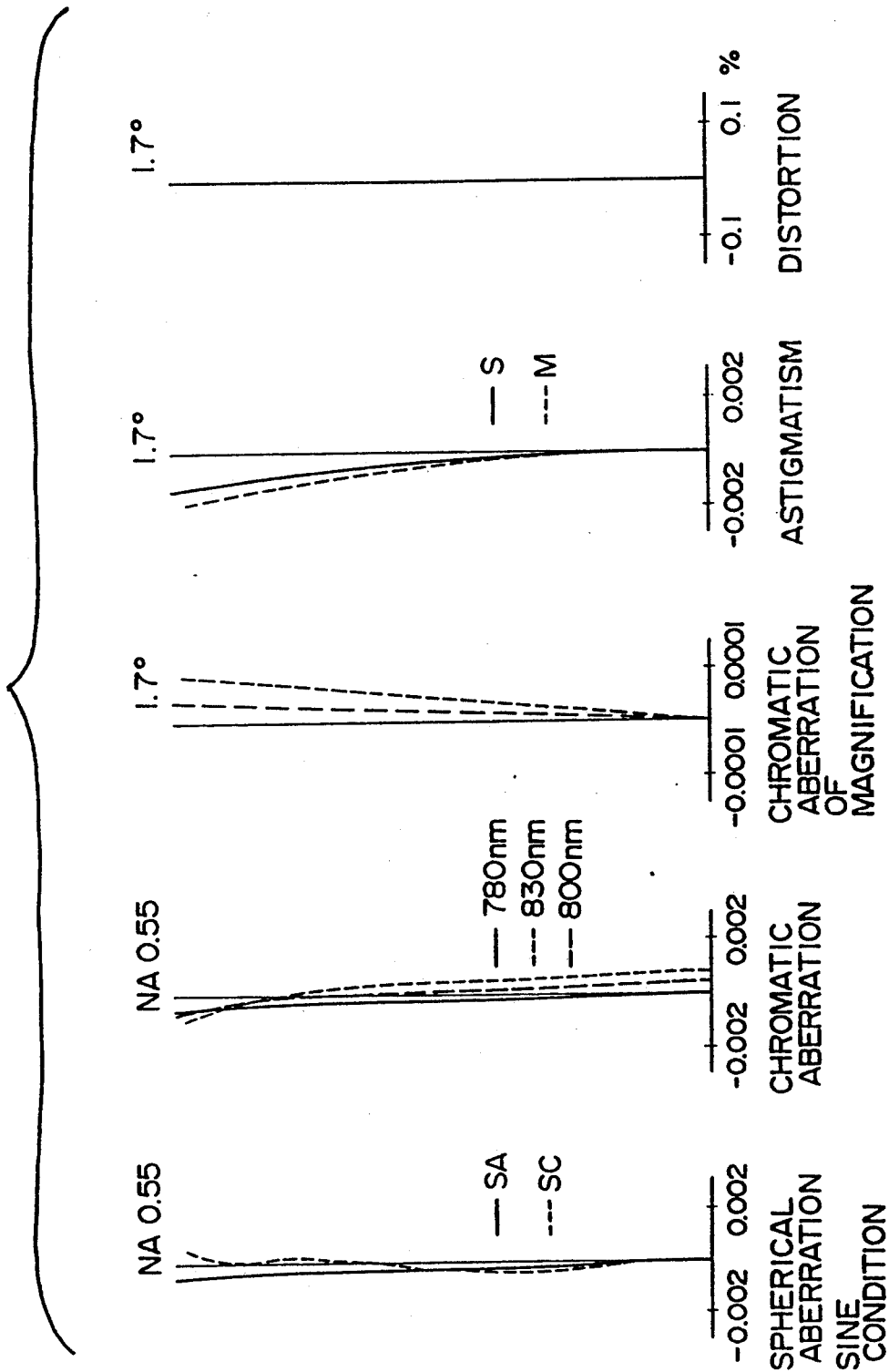
FIG. 10 are various aberration diagrams of the objective optical system shown in FIG. 9.
Figure 11:
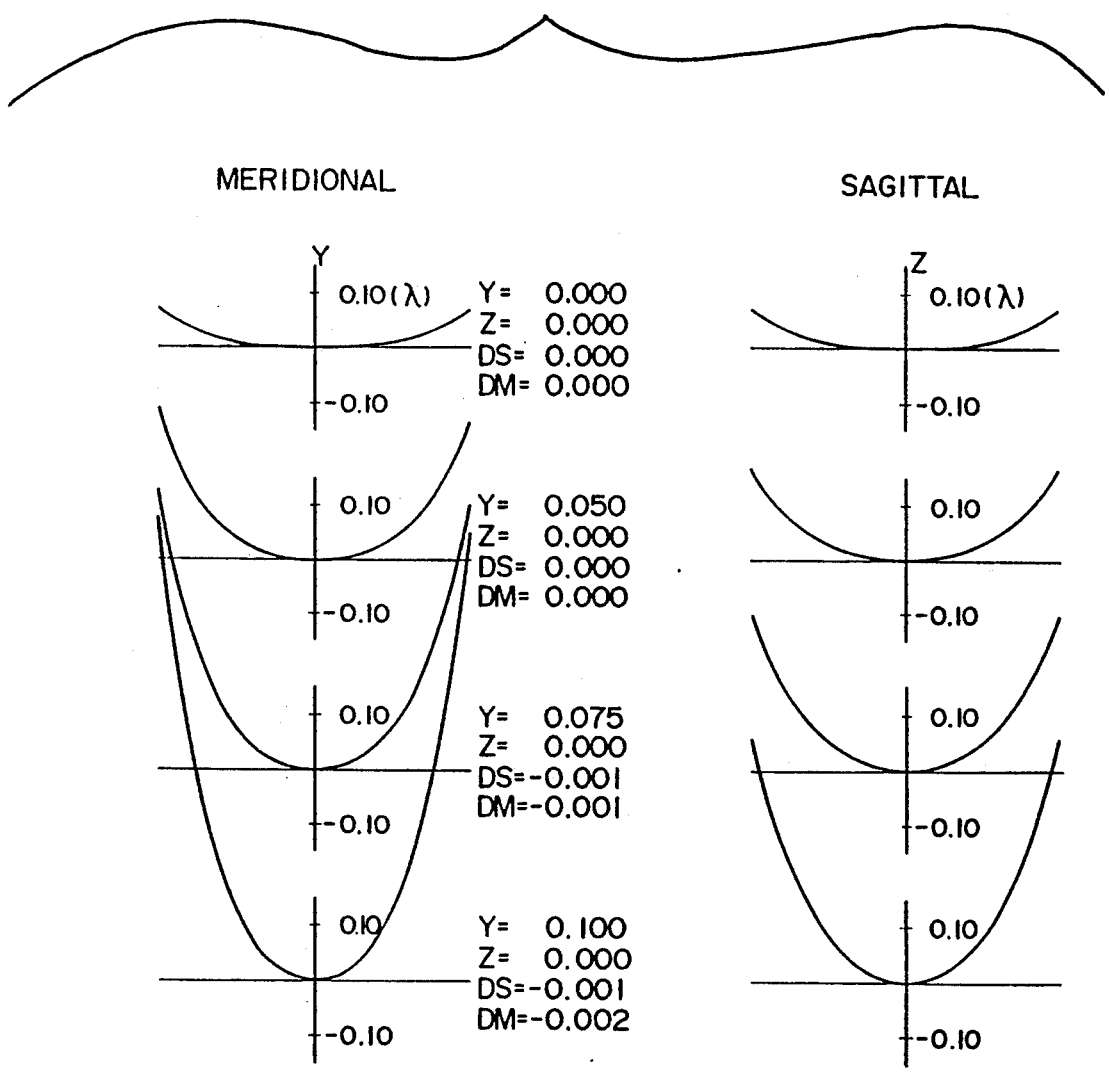
FIG. 11 are wave aberration diagrams of the objective optical system shown in FIG. 9.

Various aberrations of this objective optical system are shown in FIG. 10 and the wave aberrations are shown in FIG. 11.

In TABLE 3, it can be obtained almost the same efficiency when $r_1 = r_3 = 500$ is given.

EXAMPLE 2

Figure 12:
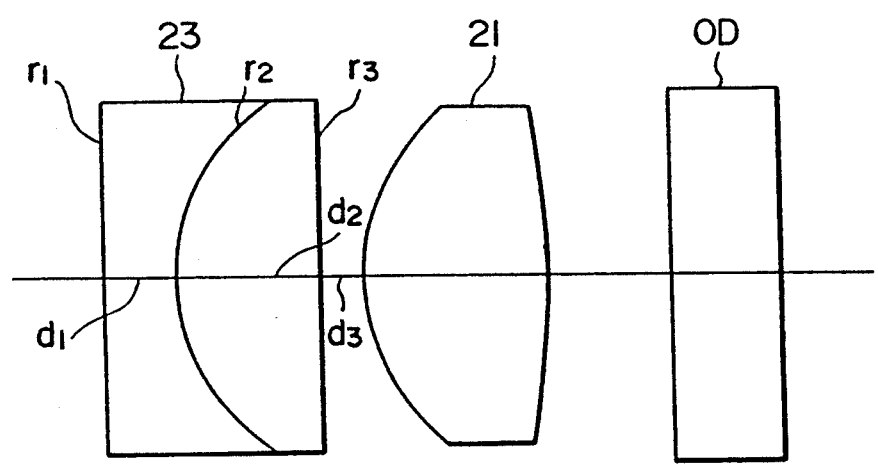
FIG. 12 is a lens diagram showing EXAMPLE 2 of an Objective optical system.

FIG. 12 shows EXAMPLE 2 of the objective optical system. The numerical value construction of the chromatic aberration correcting element is shown in Table 4. The objective lens and the cover glass of the optical disk is the same to that of EXAMPLE 1.

Figure 13:
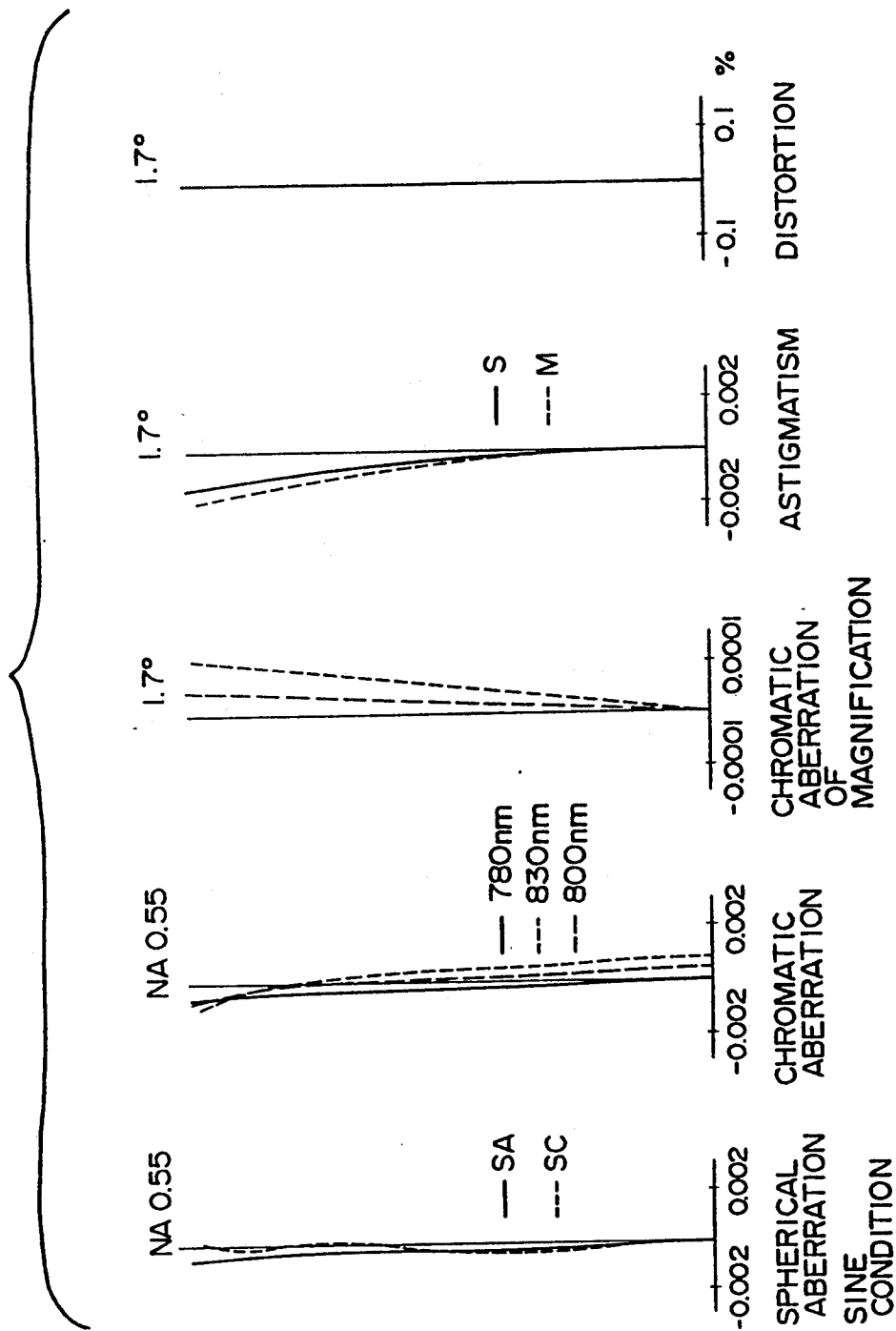
FIG. 13 are various aberration diagrams of the objective optical system shown in FIG. 12.
Figure 14:
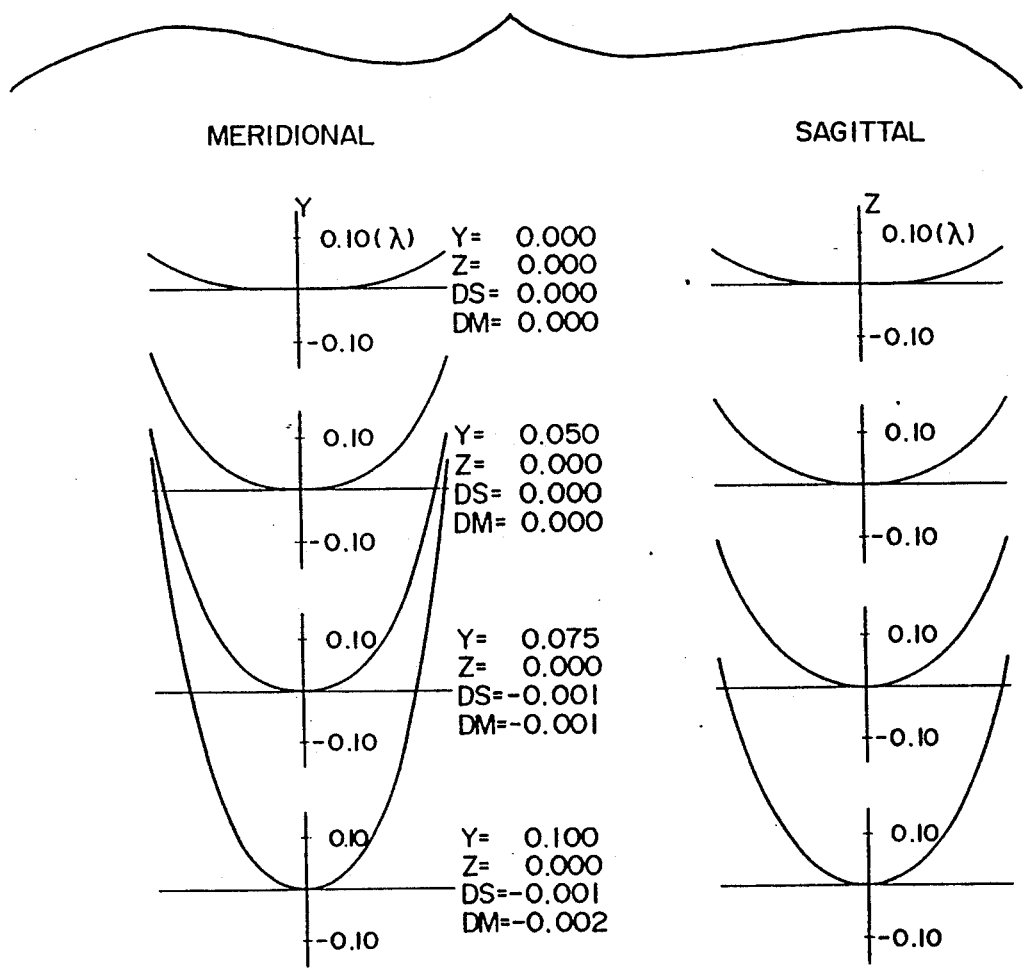
FIG. 14 are wave aberration diagrams of the objective optical system shown in FIG. 12.

Various aberrations of this objective optical system are shown in FIG. 13 and the wave aberrations are shown in FIG. 14.

TABLE 4

| surface NO. | r | d | $n_{780}$ | $n_d$ | $v_{780}$ | glass material name |
|---|---|---|---|---|---|---|
| | NA 0.55 | f = 3.30 | $\omega$ = 1.7° | | | |
| 1 | $\infty$ | 0.080 | 1.72421 | 1.74077 | 684 | SF13 |
| 2 | 2.200 | 1.600 | 1.72437 | 1.73400 | 1071 | LaK09 |
| 3 | $\infty$ | 0.500 | | | | |

EXAMPLE 3

Figure 15:
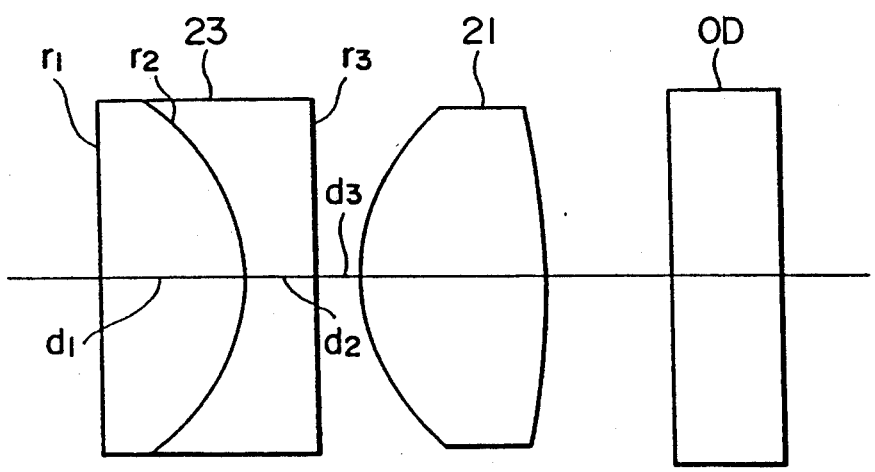
FIG. 15 is a lens diagram showing EXAMPLE 3 of an objective optical system.

FIG. 15 shows EXAMPLE 3 of the objective optical system. The numerical value construction of the chromatic aberration correcting element is shown in Table 5. The objective lens and the cover glass of the optical disk is the same to that of EXAMPLE 1.

TABLE 5

| surface NO. | r | d | $n_{780}$ | $n_d$ | $v_{780}$ | glass material name |
|---|---|---|---|---|---|---|
| | NA 0.55 | f = 3.30 | $\omega$ = 1.7° | | | |
| 1 | $\infty$ | 1.600 | 1.68442 | 1.69350 | 1136 | LaK08 |

TABLE 5-continued

| surface NO. | r | d | $n_{780}$ | $n_d$ | $v_{780}$ | glass material name |
|---|---|---|---|---|---|---|
| | NA 0.55 | f = 3.30 | $\omega$ = 1.7° | | | |
| 2 | −2.200 | 0.800 | 1.68443 | 1.69895 | 755 | SF15 |
| 3 | $\infty$ | 0.500 | | | | |

Figure 16:
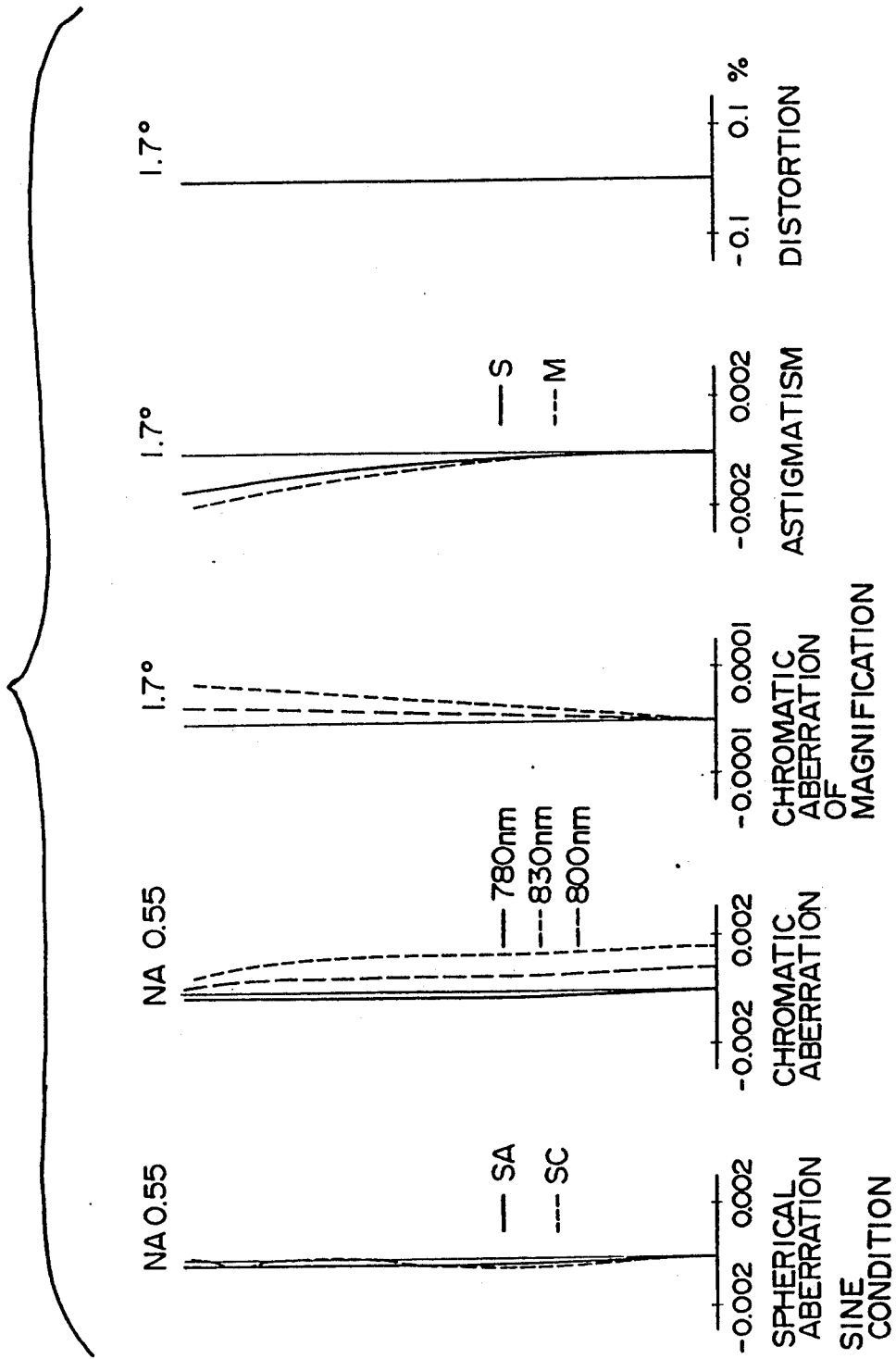
FIG. 16 are various aberration diagrams of the objective optical system shown in FIG. 15.
Figure 17:
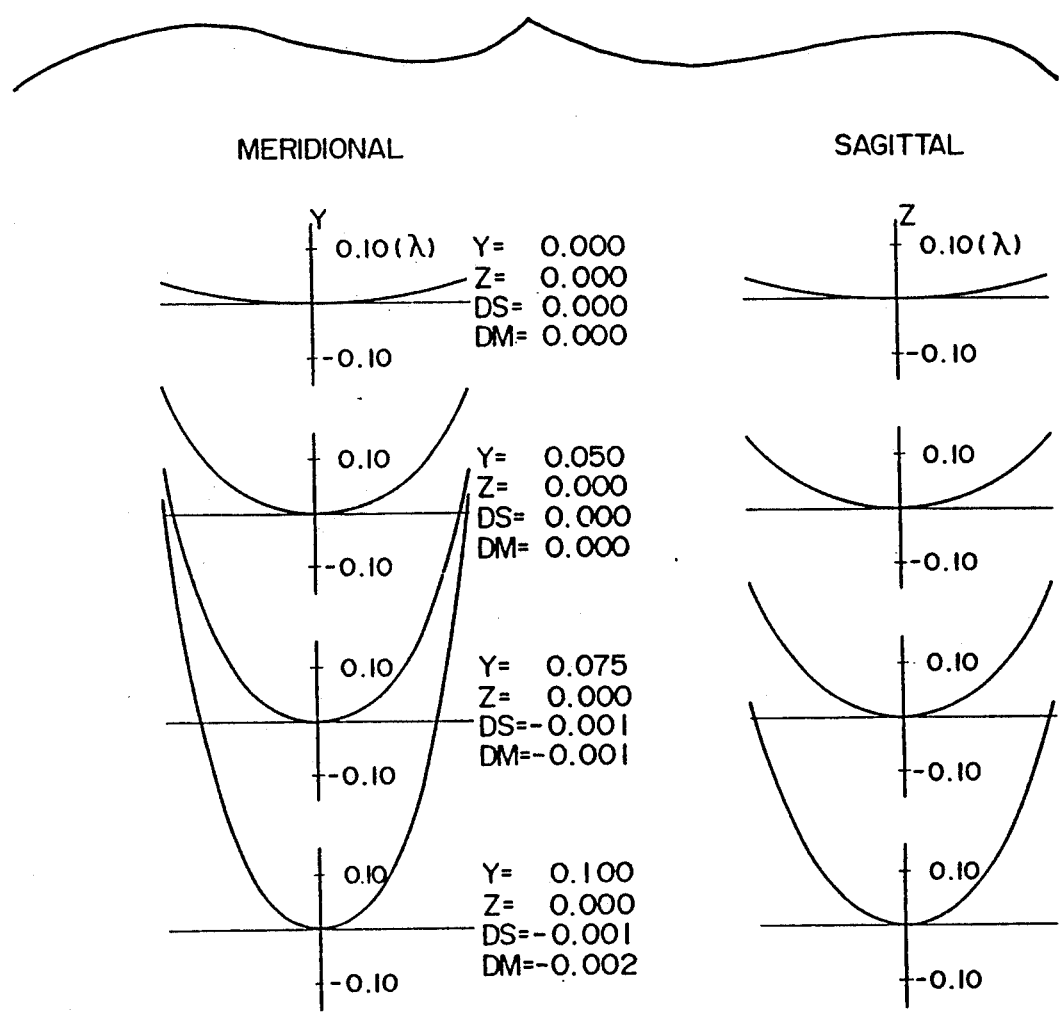
FIG. 17 are wave aberration diagrams of the objective optical system shown in FIG. 15.

Various aberrations of this objective optical system are shown in FIG. 16 and the wave aberrations are shown in FIG. 17.

EXAMPLE 4

Figure 18:
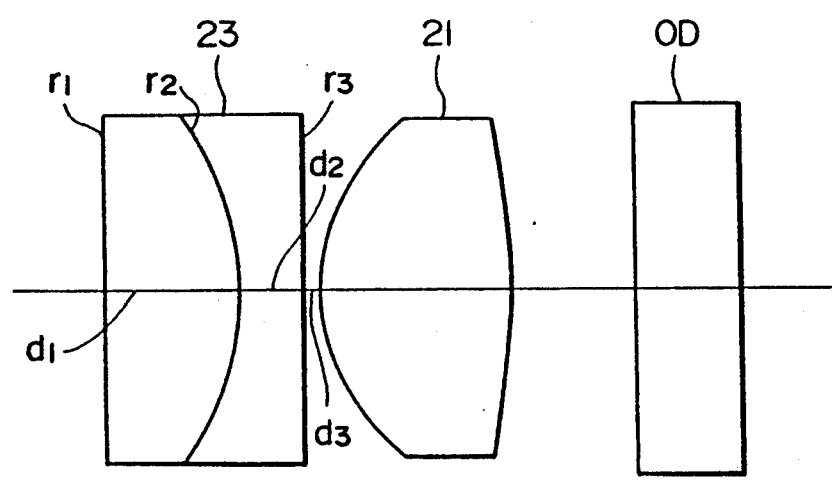
FIG. 18 is a lens diagram showing EXAMPLE 4 of an objective optical system.

FIG. 18 shows EXAMPLE 4 of the objective optical system. The numerical value construction of the chromatic aberration correcting element is shown in Table 6. The objective lens and the cover glass of the optical disk is the same to that of EXAMPLE 1.

Figure 19:
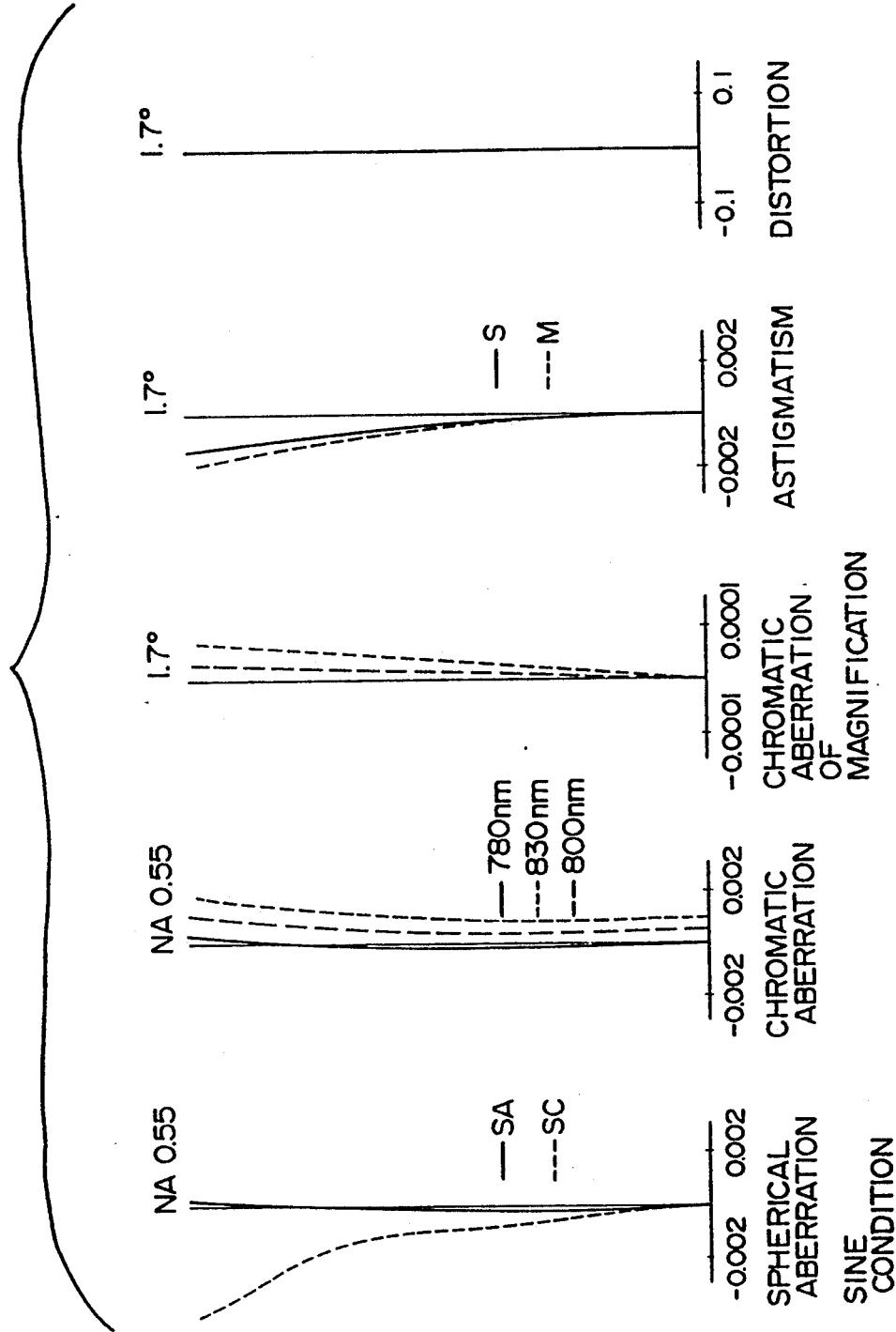
FIG. 19 are various aberration diagrams of the objective optical system shown in FIG. 18.
Figure 20:
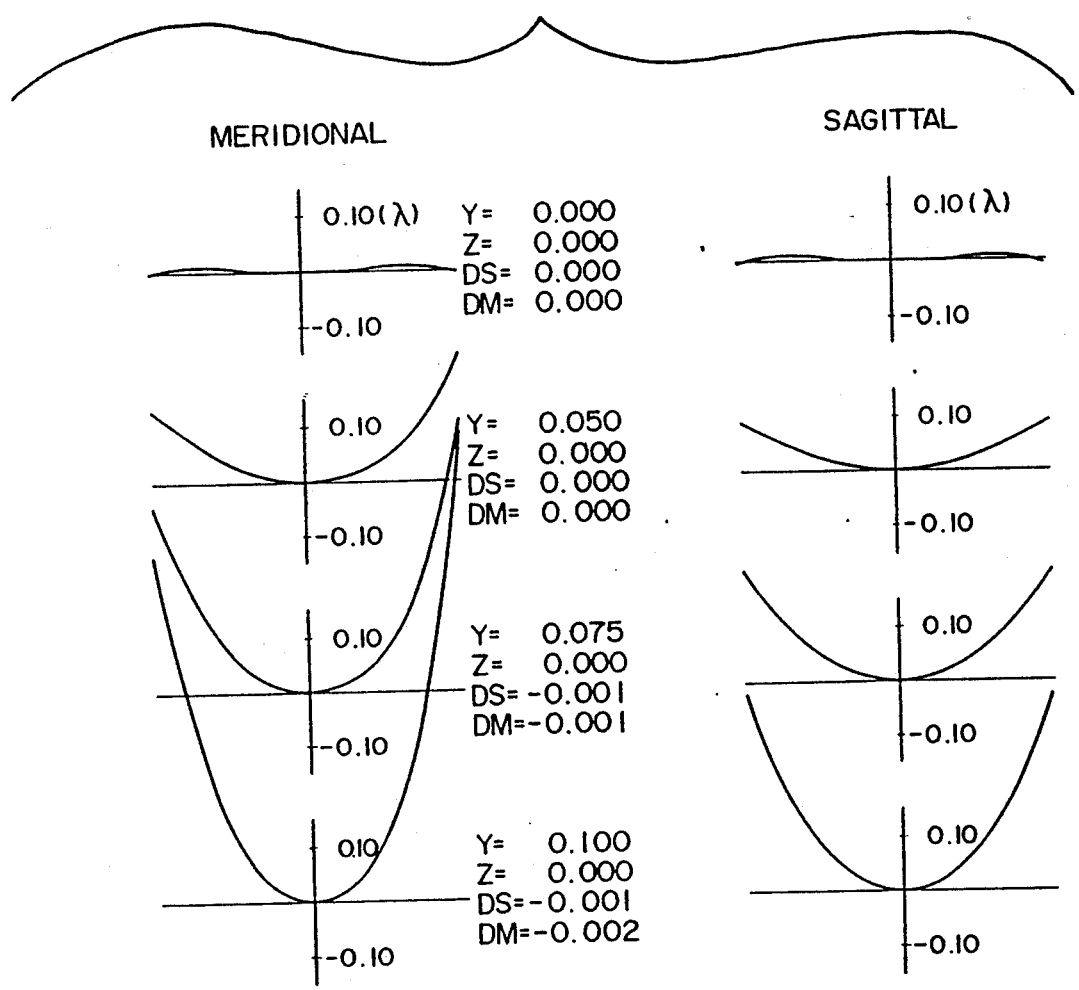
FIG. 20 are wave aberration diagrams of the objective optical system shown in FIG. 18.

Various aberrations of this objective optical system are shown in FIG. 19 and the wave aberrations are shown in FIG. 20.

TABLE 6

| surface NO. | r | d | $n_{780}$ | $v_{780}$ | glass material name |
|---|---|---|---|---|---|
| | NA = 0.55 | f = 3.31 | $\omega$ = 1.7° | | |
| 1 | $\infty$ | 1.50 | 1.82195 | 875 | LaSF05 |
| 2 | −3.000 | 0.70 | 1.82484 | 553 | SFL03 |
| 3 | $\infty$ | 0.20 | | | |

EXAMPLE 5

Figure 21:
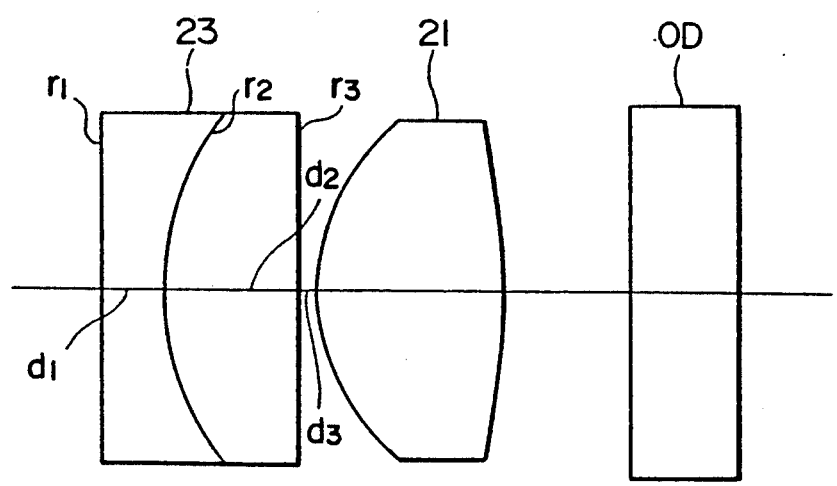
FIG. 21 is a lens diagram showing EXAMPLE 5 of an objective optical system.

FIG. 21 shows EXAMPLE 5 of the objective optical system. The numerical value construction of the chromatic aberration correcting element is shown in Table 7. The objective lens and the cover glass of the optical disk is the same to that of EXAMPLE 1.

Figure 22:
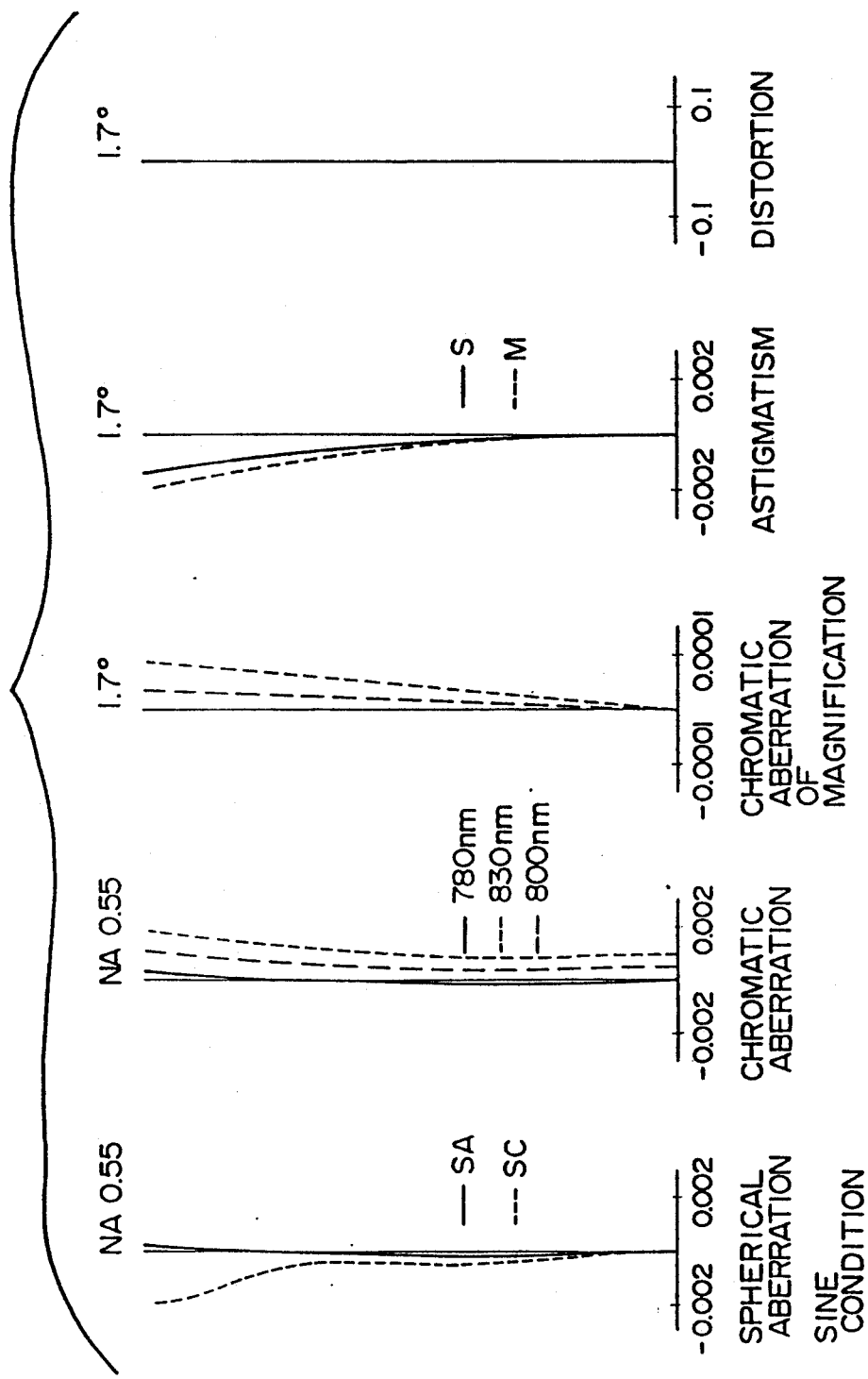
FIG. 22 are various aberration diagrams of the objective optical system shown in FIG. 21.
Figure 23:
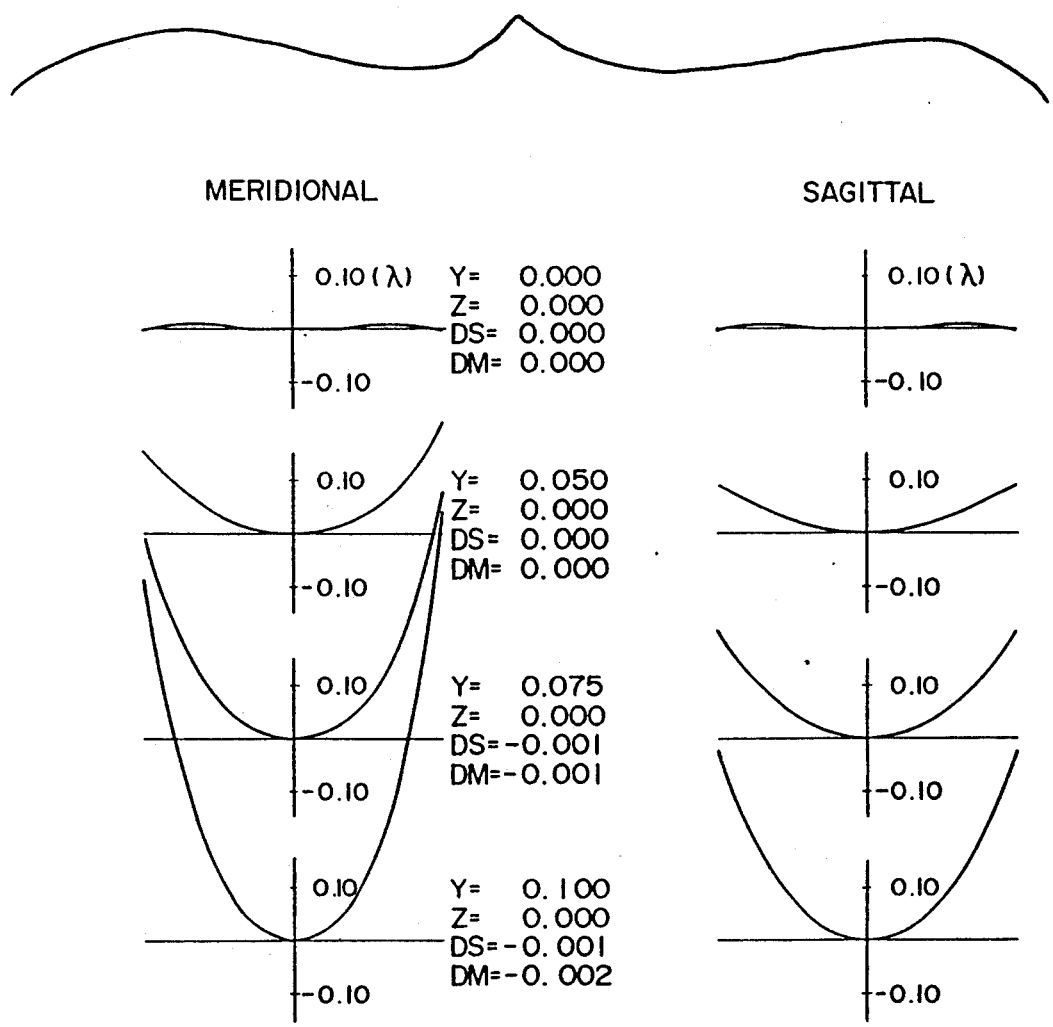
FIG. 23 are wave aberration diagrams of the objective optical system shown in FIG. 21.

Various aberrations of this objective optical system are shown in FIG. 22 and the wave aberrations are shown in FIG. 23.

TABLE 7

| surface NO. | r | d | $n_{780}$ | $v_{780}$ | glass material name |
|---|---|---|---|---|---|
| | NA = 0.55 | f = 3.31 | $\omega$ = 1.7° | | |
| 1 | $\infty$ | 0.70 | 1.82484 | 553 | SFL03 |
| 2 | 3.000 | 1.50 | 1.82195 | 875 | LaSF05 |
| 3 | $\infty$ | 0.20 | | | |

EXAMPLE 6

Figure 24:
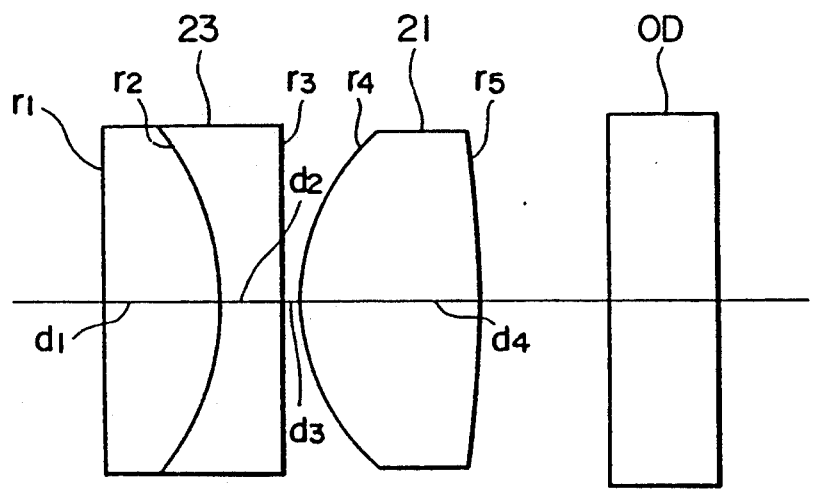
FIG. 24 is a lens diagram showing EXAMPLE 6 of an objective optical system.
Figure 25:
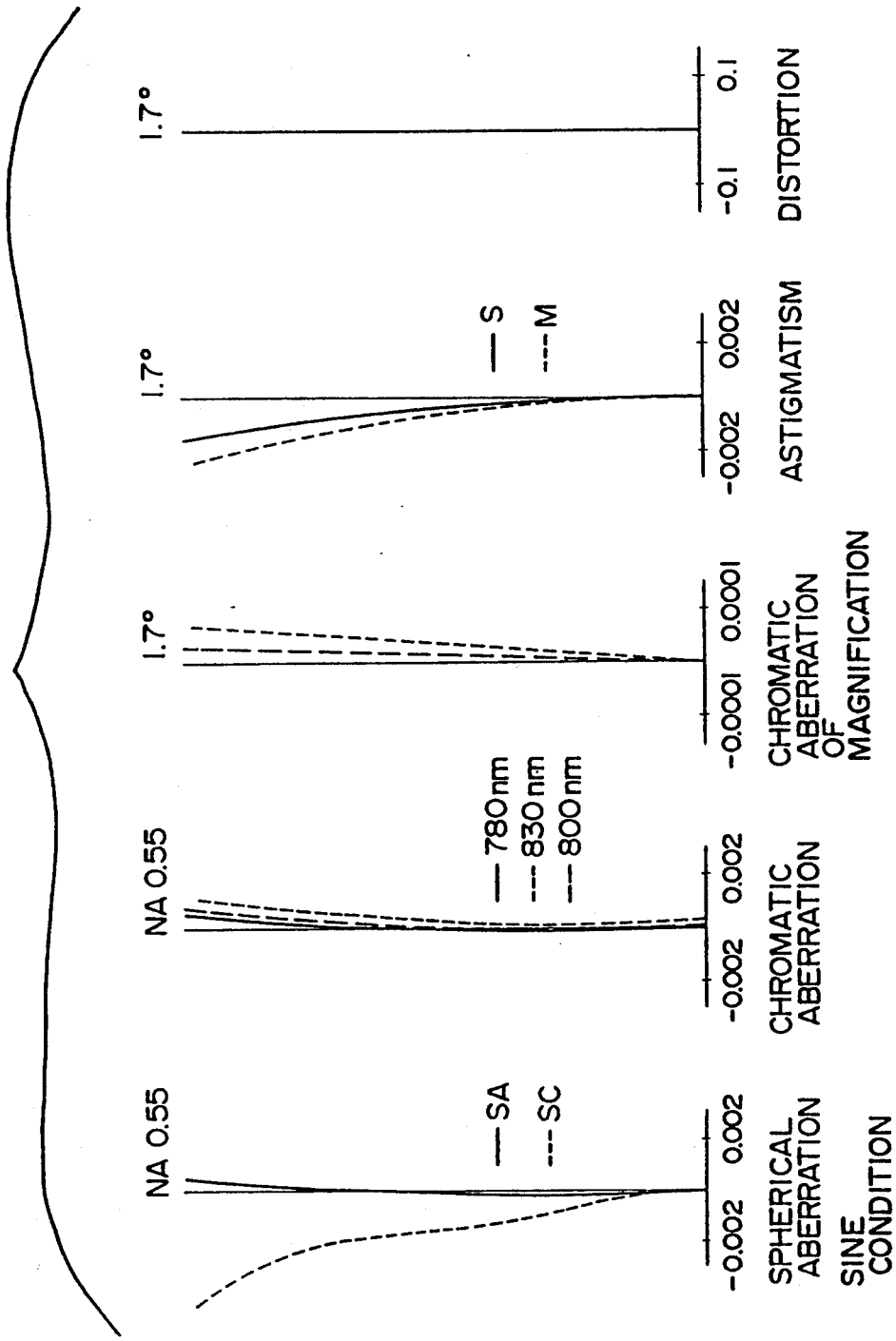
FIG. 25 are various aberration diagrams of the objective optical system shown in FIG. 24.
Figure 26:
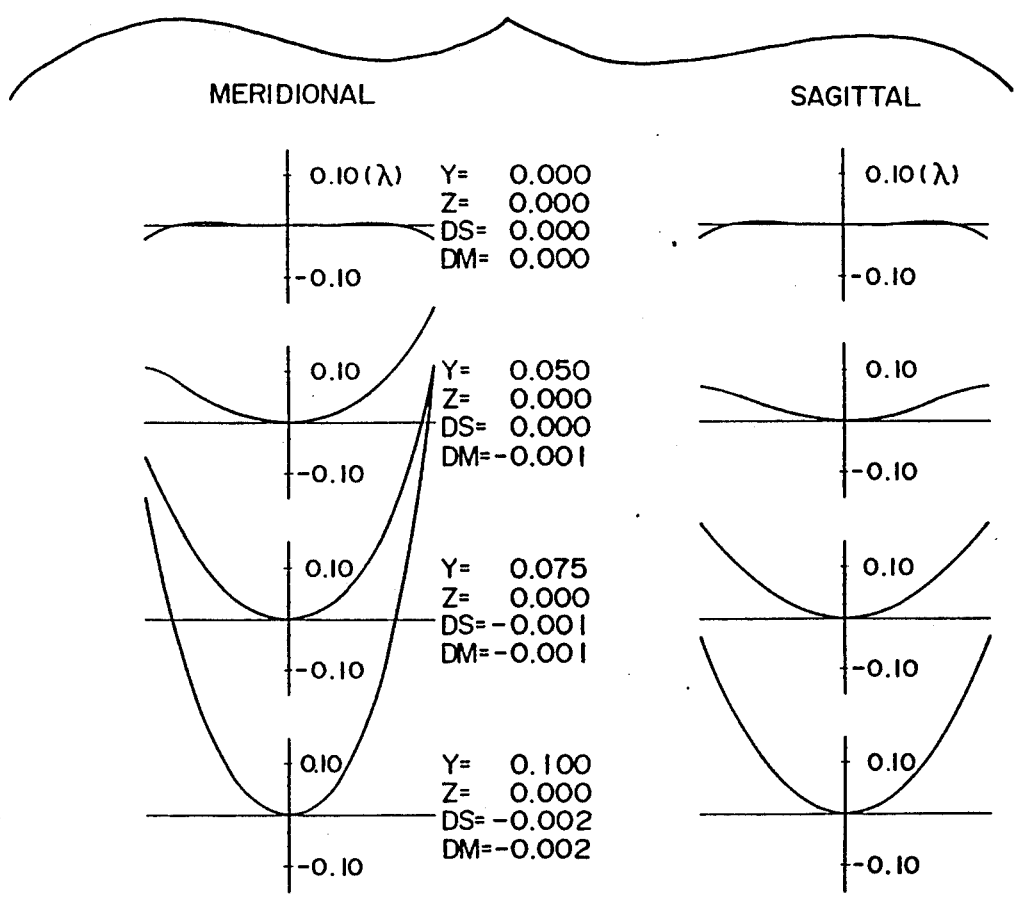
FIG. 26 are wave aberration diagrams of the objective optical system shown in FIG. 24.
Figure 27:
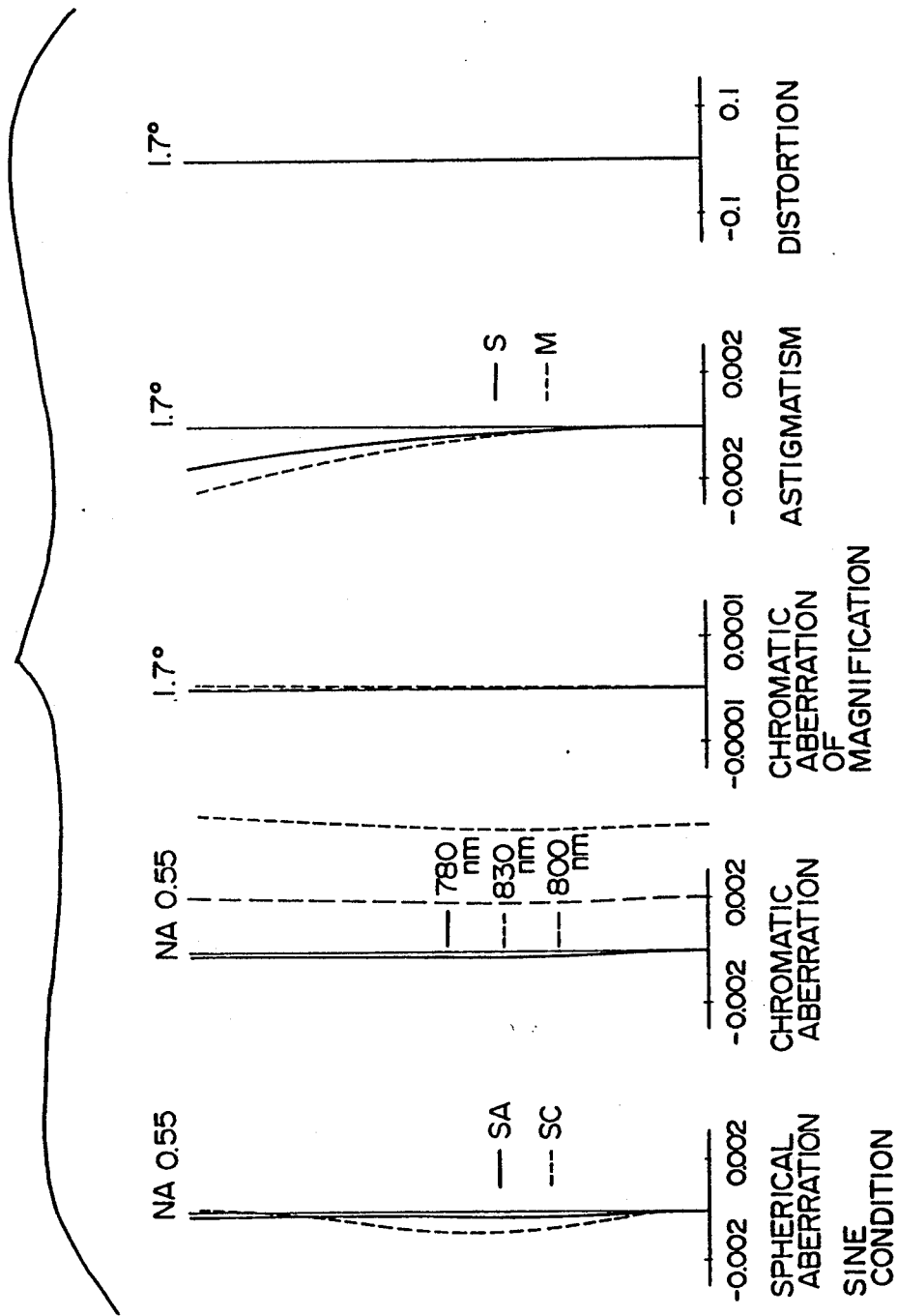
FIG. 27 are wave aberration diagrams by a single unit of the objective lens shown in FIG. 24.
Figure 28:
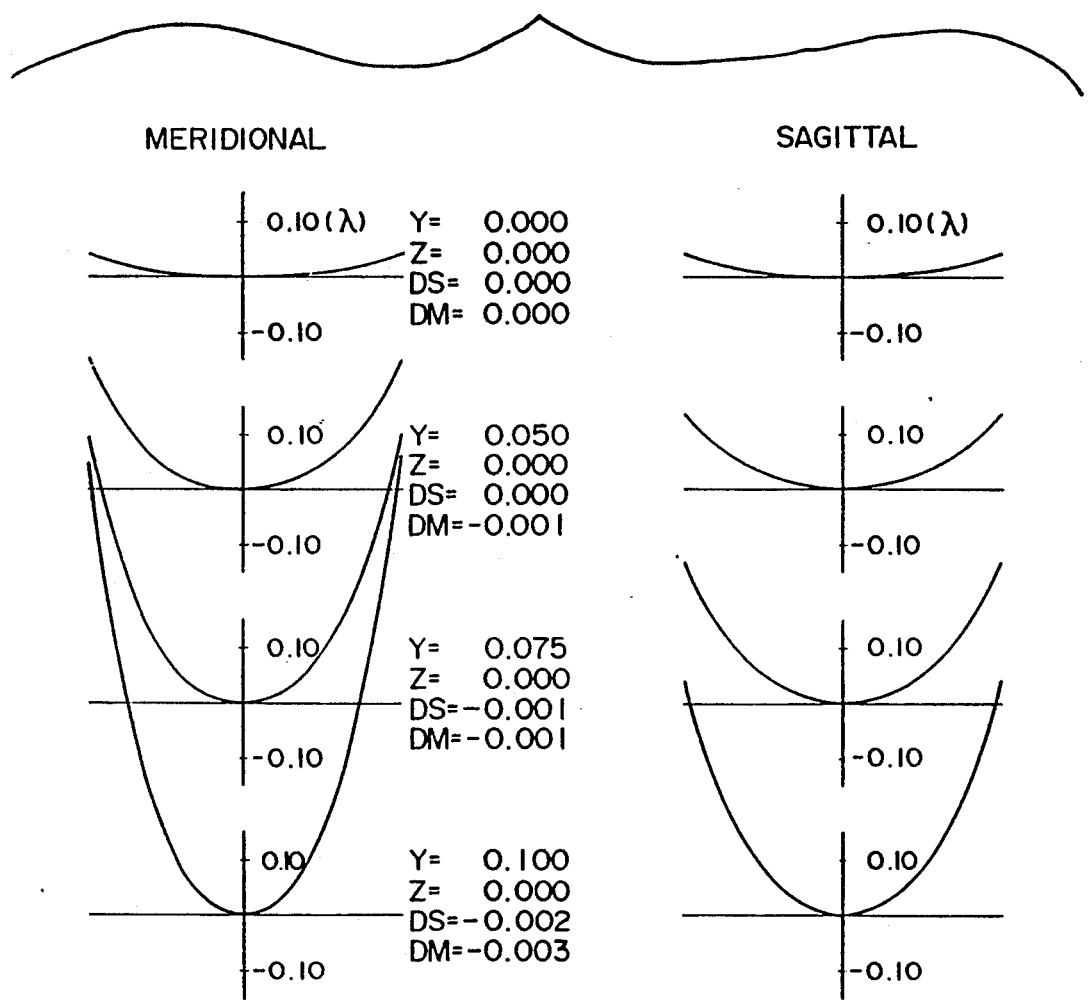
FIG. 28 are wave aberration diagrams by a single unit of the objective lens shown in FIG. 24.

FIG. 24 shows EXAMPLE 6 of the objective optical system and concrete numerical value construction is shown in TABLE 8. The aspherical coefficients of the objective lens are shown in TABLE 9. Various aberrations of this objective optical system are shown in FIG. 22 and the wave aberrations are shown in FIG. 23. Also, in order to determine affection given to the chromatic aberration correcting element, various aberrations and the wave aberrations by a single unit of the objective lens are shown in FIGS. 27 and 28.

TABLE 8

| surface NO. | r | d | $n_{780}$ | $v_{780}$ | glass material name |
|---|---|---|---|---|---|
| | NA = 0.55 | f = 3.31 | $\omega$ = 1.7° | | |
| 1 | $\infty$ | 1.30 | 1.82195 | 875 | LaSF05 |
| 2 | −2.900 | 0.70 | 1.82484 | 553 | SFL03 |
| 3 | $\infty$ | 0.20 | | | |

TABLE 8-continued

| surface NO. | r | d | $n_{780}$ | $\nu_{780}$ | glass material name |
|---|---|---|---|---|---|
| | NA = 0.55 | f = 3.31 | $\omega$ = 1.7° | | |
| 4 | 2.116 | 2.00 | 1.53670 | 1507 | |
| 5 | −7.278 | | | | |

TABLE 9

| | 4th surface | 5th surface |
|---|---|---|
| K | −0.5086E + 00 | −0.9722E + 00 |
| $A_4$ | 0.5580E − 04 | 0.1344E − 01 |
| $A_6$ | −0.1938E − 04 | −0.2130E − 02 |
| $A_8$ | 0.3046E − 04 | 0.1502E − 03 |
| $A_{10}$ | −0.1039E − 04 | 0.2659E − 05 |
| $A_{12}$ | 0.0000E + 00 | 0.0000E + 00 |

EXAMPLE 7

Figure 29:
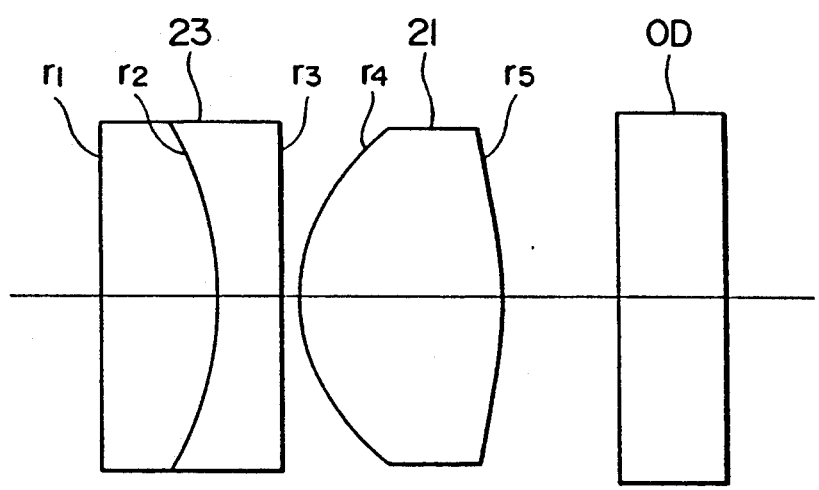
FIG. 29 is a lens diagram showing EXAMPLE 7 of an objective optical system.
Figure 30:
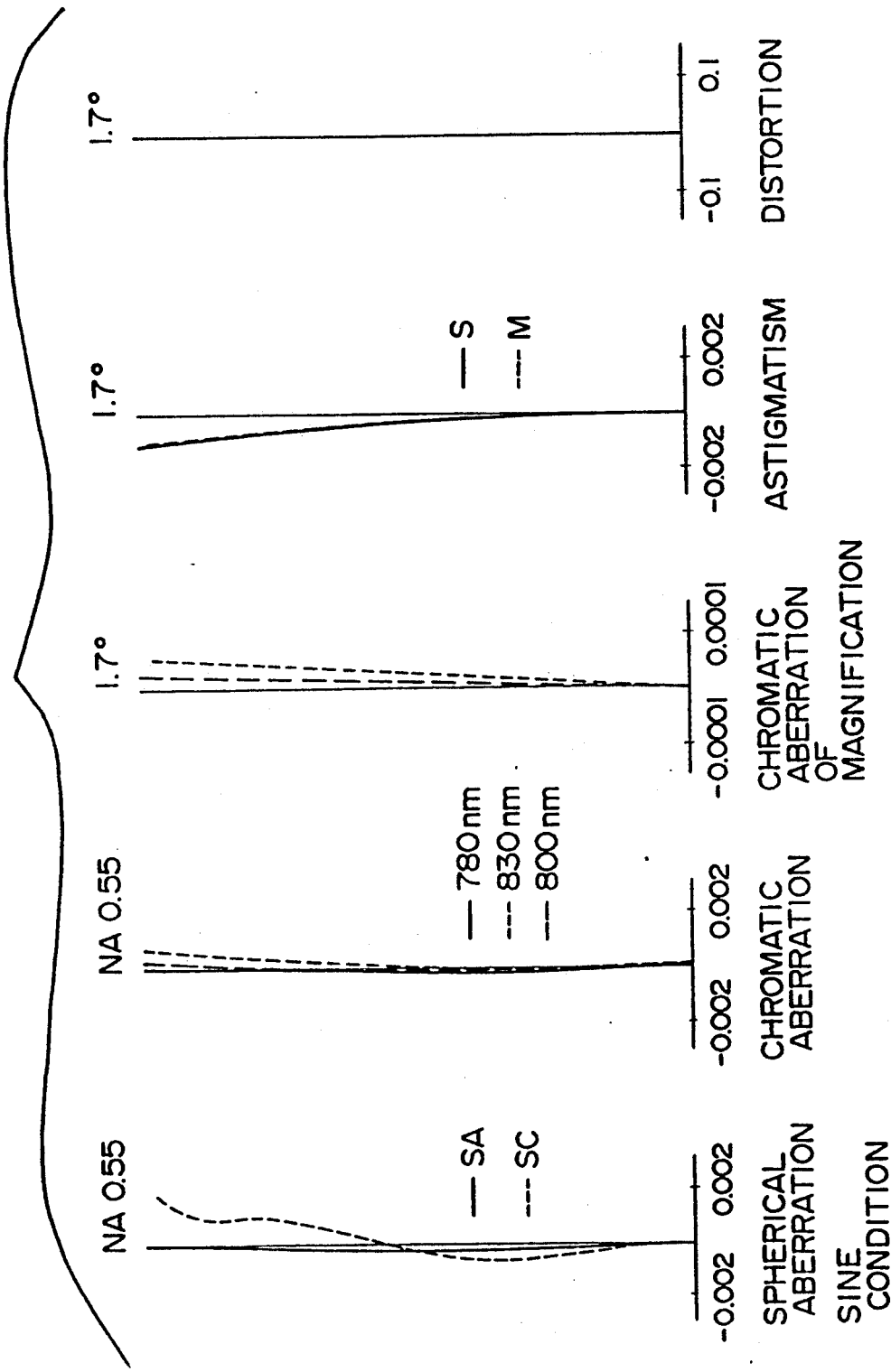
FIG. 30 are various aberration diagrams of the objective optical systems shown in FIG. 29.
Figure 31:
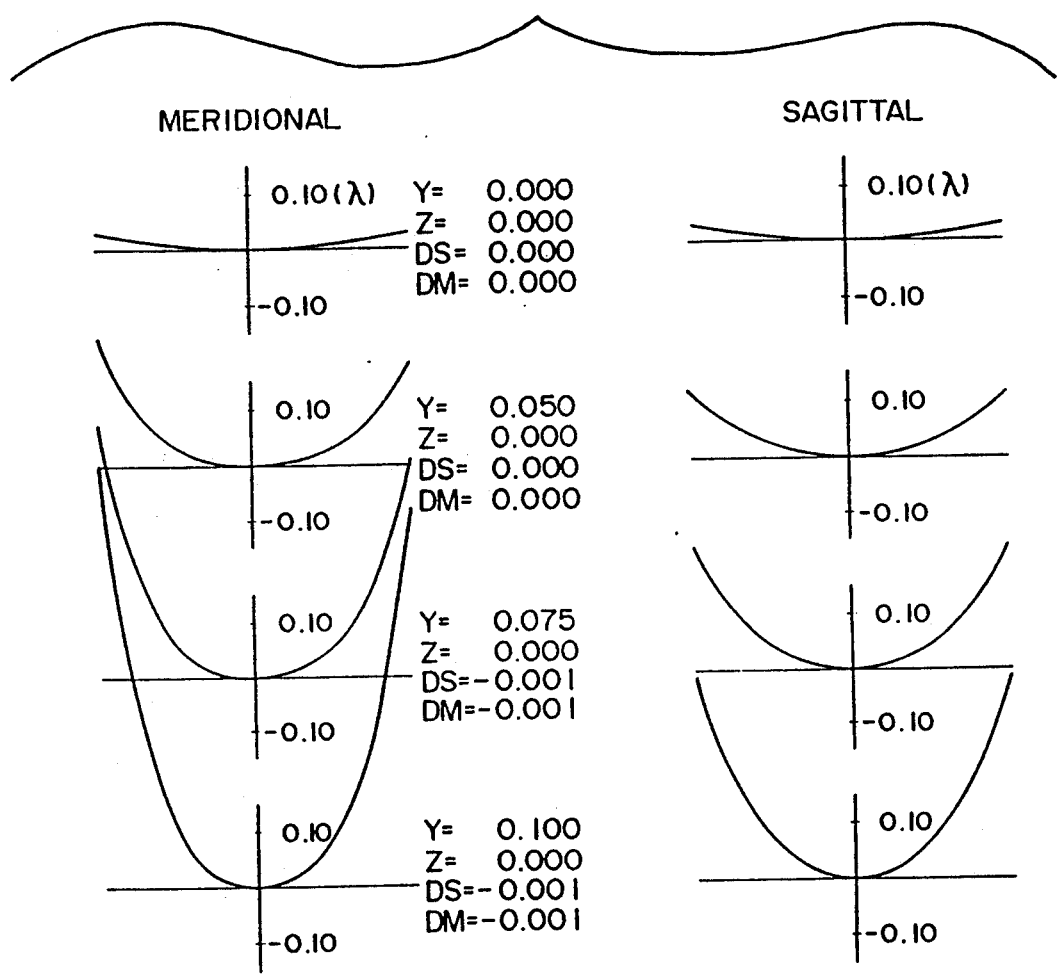
FIG. 31 are wave aberration diagrams of the objective optical system shown in FIG. 29.
Figure 32:
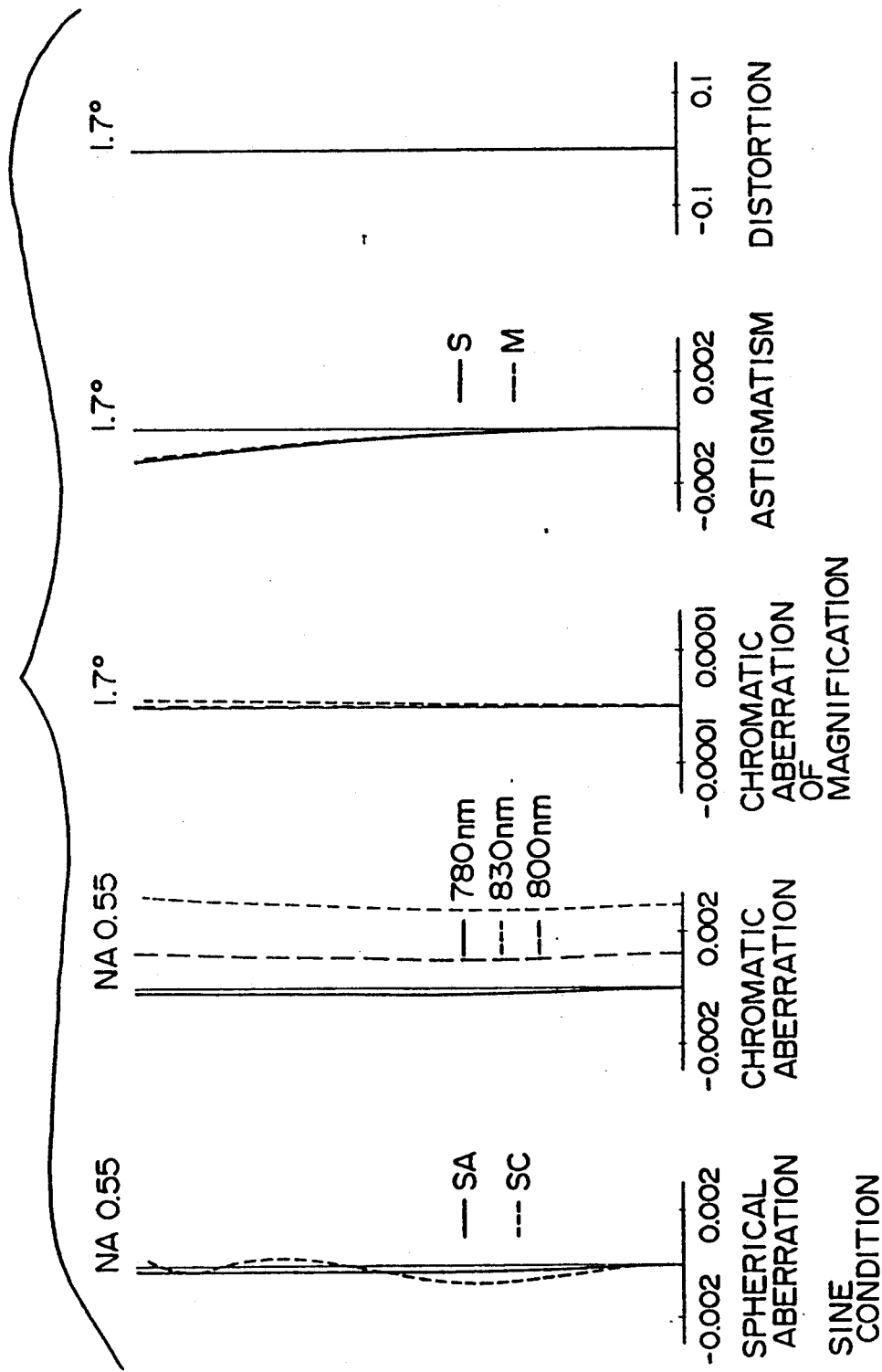
FIG. 32 are various aberration diagrams of a single unit of the objective lens shown in FIG. 29.
Figure 33:
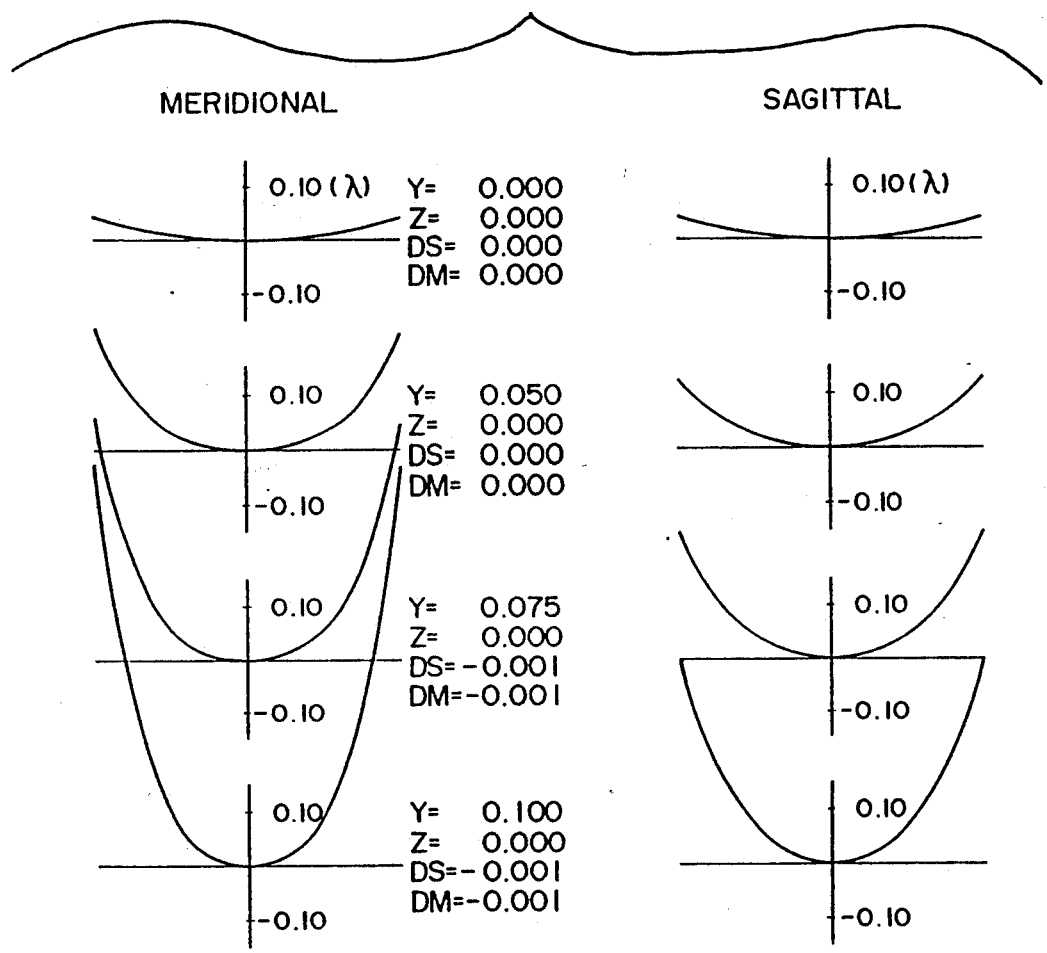
FIG. 33 are wave aberration diagrams by a single unit of the objective lens shown in FIG. 29.

FIG. 29 shows EXAMPLE 7 of the objective optical system, concrete numerical value construction is shown in TABLE 10 and the coefficient of the aspherical surface of the objective lens is shown in TABLE 11. Various aberrations of this objective optical system are shown in FIG. 30 and the wave aberrations are shown in FIG. 31. Also, in order to determine affection given to the chromatic aberration correcting element, various aberrations and the wave aberrations by a single unit of the objective lens are shown in FIGS. 32 and 33.

TABLE 10

| surface NO. | r | d | $n_{780}$ | $\nu_{780}$ | glass material name |
|---|---|---|---|---|---|
| | NA = 0.55 | f = 3.30 | $\omega$ = 1.7° | | |
| 1 | ∞ | 1.30 | 1.78705 | 880 | LaSF02 |
| 2 | −3.600 | 0.70 | 1.78565 | 601 | SFL6 |
| 3 | ∞ | 0.20 | | | |
| 4 | 1.883 | 2.24 | 1.43107 | 1461 | |
| 5 | −3.732 | | | | |

TABLE 11

| | 4th surface | 5th surface |
|---|---|---|
| K | −0.5627E + 00 | −0.4708E + 01 |
| $A_4$ | −0.1402E − 03 | 0.2011E − 01 |
| $A_6$ | −0.6290E − 04 | −0.5946E − 02 |
| $A_8$ | 0.4537E − 04 | 0.9448E − 03 |
| $A_{10}$ | −0.2548E − 04 | −0.6470E − 04 |
| $A_{12}$ | 0.0000E + 00 | 0.0000E + 00 |

EXAMPLE 8

Figure 34:
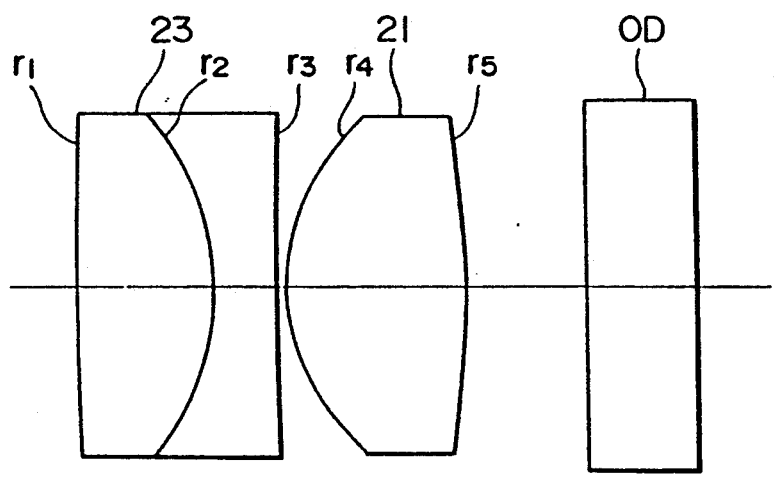
FIG. 34 is a lens diagram showing example 8 of the objective optical system.

FIG. 34 shows EXAMPLE 8 of the objective optical system, concrete numerical value construction is shown in TABLE 12 and the coefficient of the aspherical surface of the objective lens is shown in TABLE 13. In this example, first and third surfaces are not plane.

TABLE 12

| surface NO. | r | d | $n_{780}$ | $\nu_{780}$ | glass material name |
|---|---|---|---|---|---|
| | NA = 0.55 | f = 3.30 | $\omega$ = 1.7° | | |
| 1 | 50.000 | 1.50 | 1.82195 | 875 | LaSF05 |
| 2 | −2.822 | 0.70 | 1.82484 | 553 | SFL03 |
| 3 | 50.000 | 0.10 | | | |
| 4 | 2.089 | 2.00 | 1.53670 | 1507 | |
| 5 | −6.770 | | | | |

TABLE 13

| | 4th surface | 5th surface |
|---|---|---|
| K | −0.4168E + 00 | −0.5220E + 00 |
| $A_4$ | −0.9556E − 03 | 0.1663E − 01 |
| $A_6$ | −0.1979E − 03 | −0.3824E − 02 |
| $A_8$ | 0.3396E − 05 | 0.5343E − 03 |
| $A_{10}$ | −0.1894E − 04 | −0.3071E − 04 |
| $A_{12}$ | 0.0000E + 00 | 0.0000E + 00 |

Figure 35:
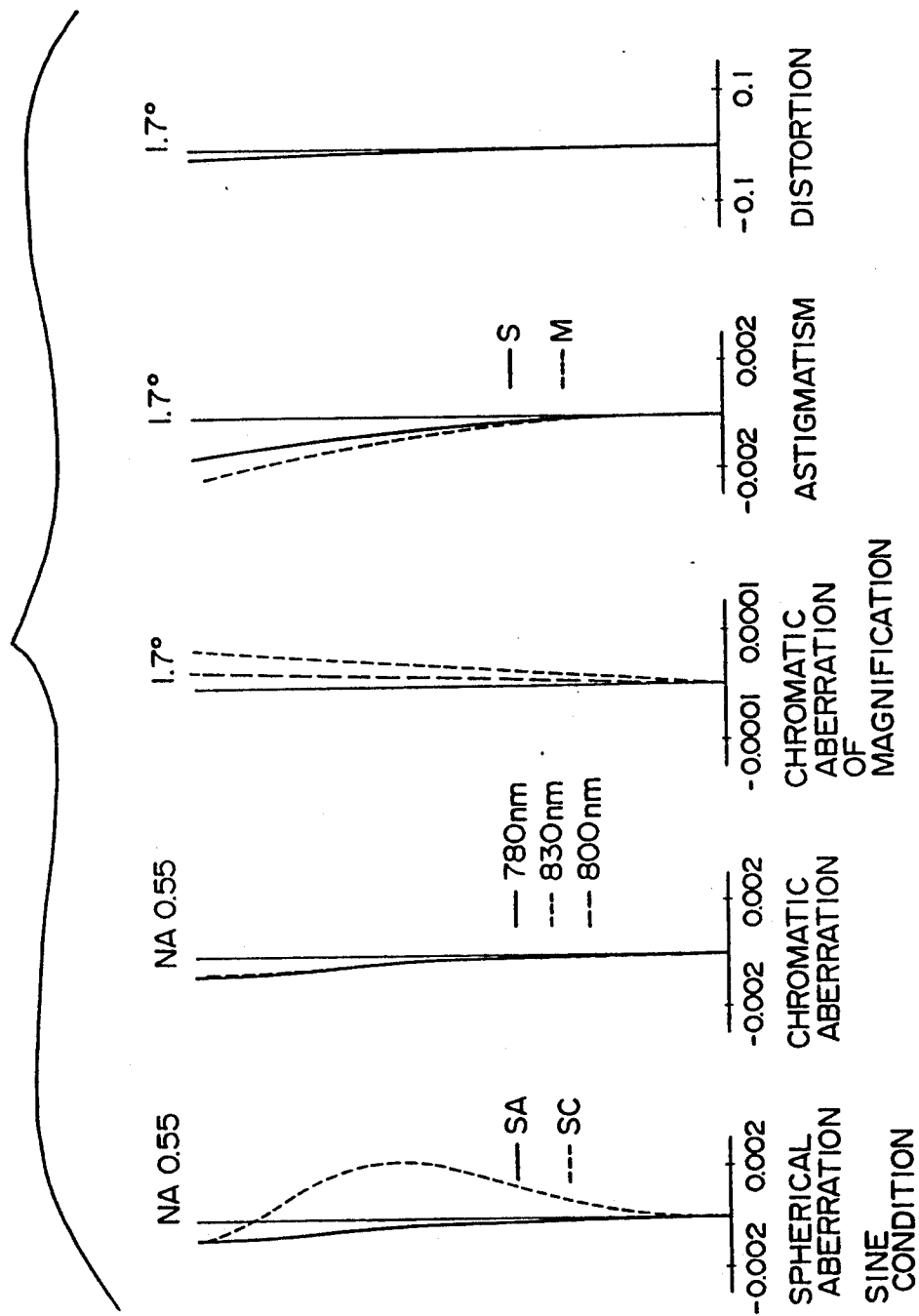
FIG. 35 are various aberration diagrams of the objective optical system shown in FIG. 34.
Figure 36:
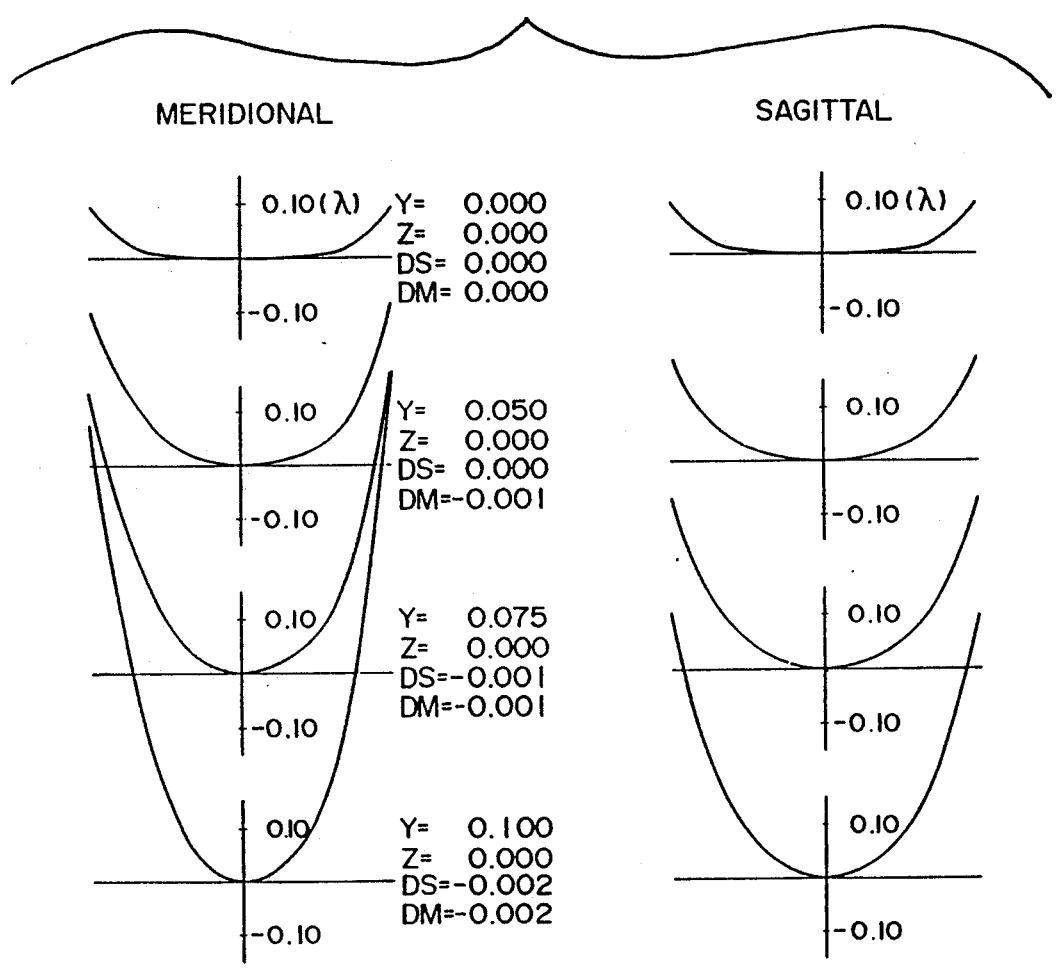
FIG. 36 are wave aberration diagrams of the objective optical system shown in FIG. 34.

Various aberrations of this objective optical system are shown in FIG. 35 and the wave aberrations are shown in FIG. 36.

EXAMPLE 9

Figure 37:
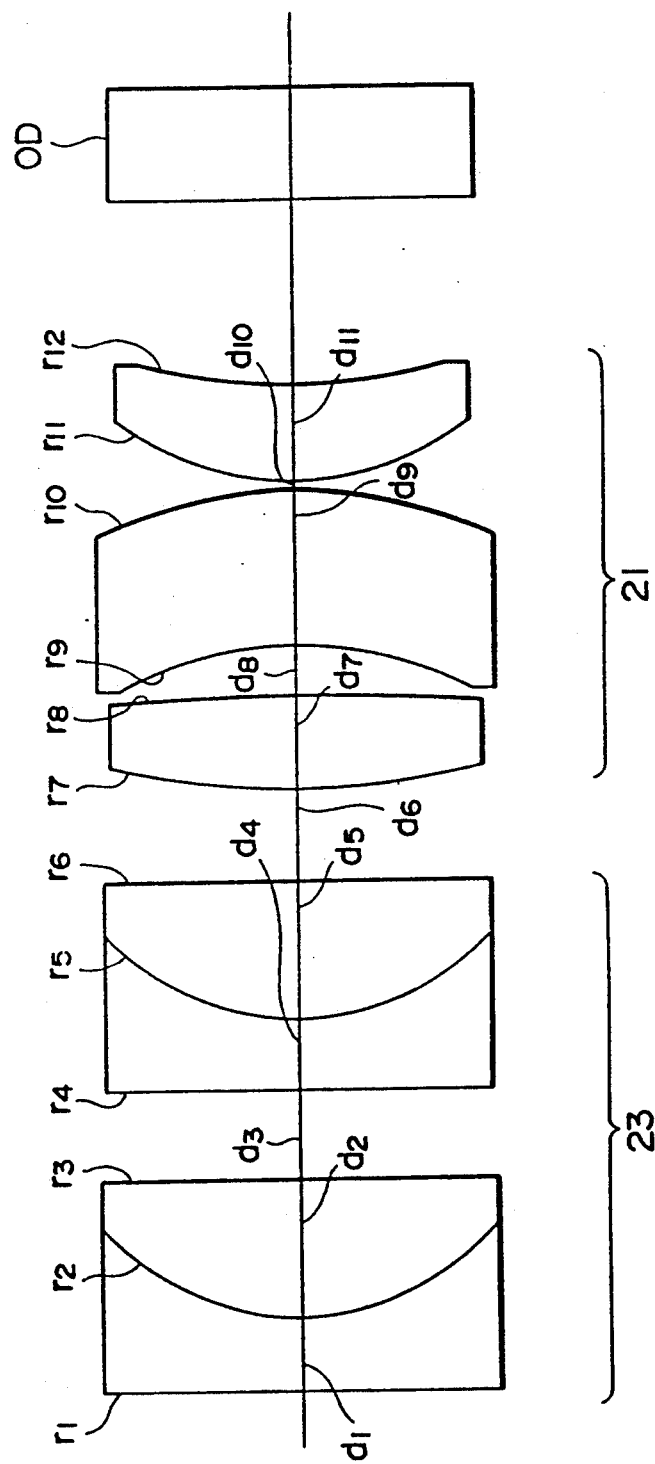
FIG. 37 is a lens diagram showing EXAMPLE 9 of the objective optical system.

FIG. 37 shows EXAMPLE 9 of the objective optical system, and concrete numerical value construction is shown in TABLE 14. In this example, a glass lens of 3 piece structure is used as the objective lens, and the optical system has two chromatic aberration correcting elements.

TABLE 14

| surface NO. | r | d | $n_{780}$ | nd | $\nu_{780}$ |
|---|---|---|---|---|---|
| | NA = 0.55 | f = 3.72 | $\omega$ = 1.5° | | |
| 1 | ∞ | 0.80 | 1.68443 | 1.69895 | 755 |
| 2 | 2.850 | 1.50 | 1.68442 | 1.69350 | 1136 |
| 3 | ∞ | 1.00 | | | |
| 4 | ∞ | 0.80 | 1.68443 | 1.69895 | 755 |
| 5 | 2.850 | 1.50 | 1.68442 | 1.69350 | 1136 |
| 6 | ∞ | 1.00 | | | |
| 7 | 9.066 | 1.00 | 1.79250 | 1.80400 | |
| 8 | −29.920 | 0.55 | | | |
| 9 | −4.080 | 1.74 | 1.78565 | 1.80518 | |
| 10 | −4.080 | 0.08 | | | |
| 11 | 3.120 | 1.07 | 1.86890 | 1.88300 | |
| 12 | 7.118 | 1.96 | | | |

Figure 38:
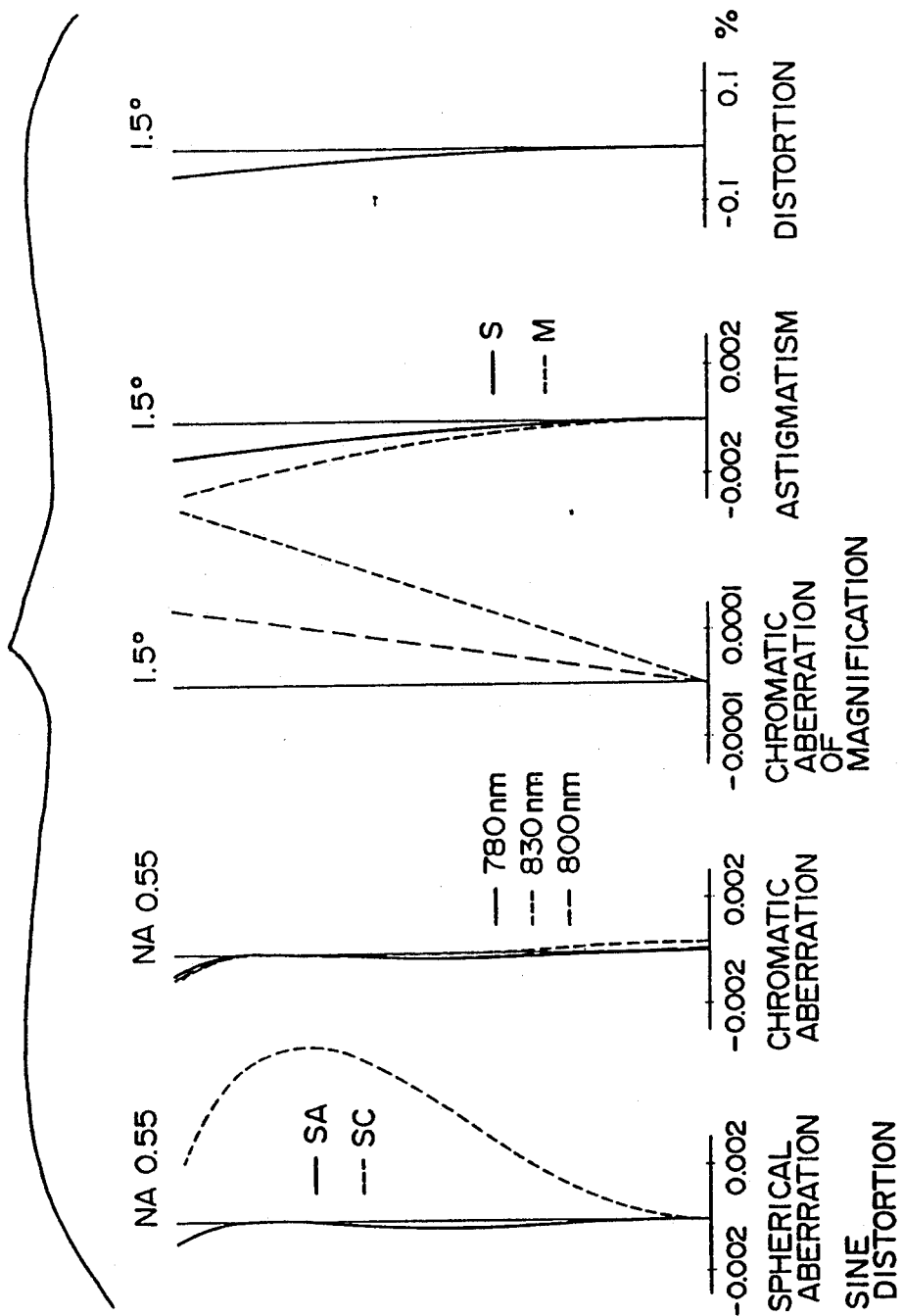
FIG. 38 are various aberration diagrams of the objective optical system shown in FIG. 37.
Figure 39:
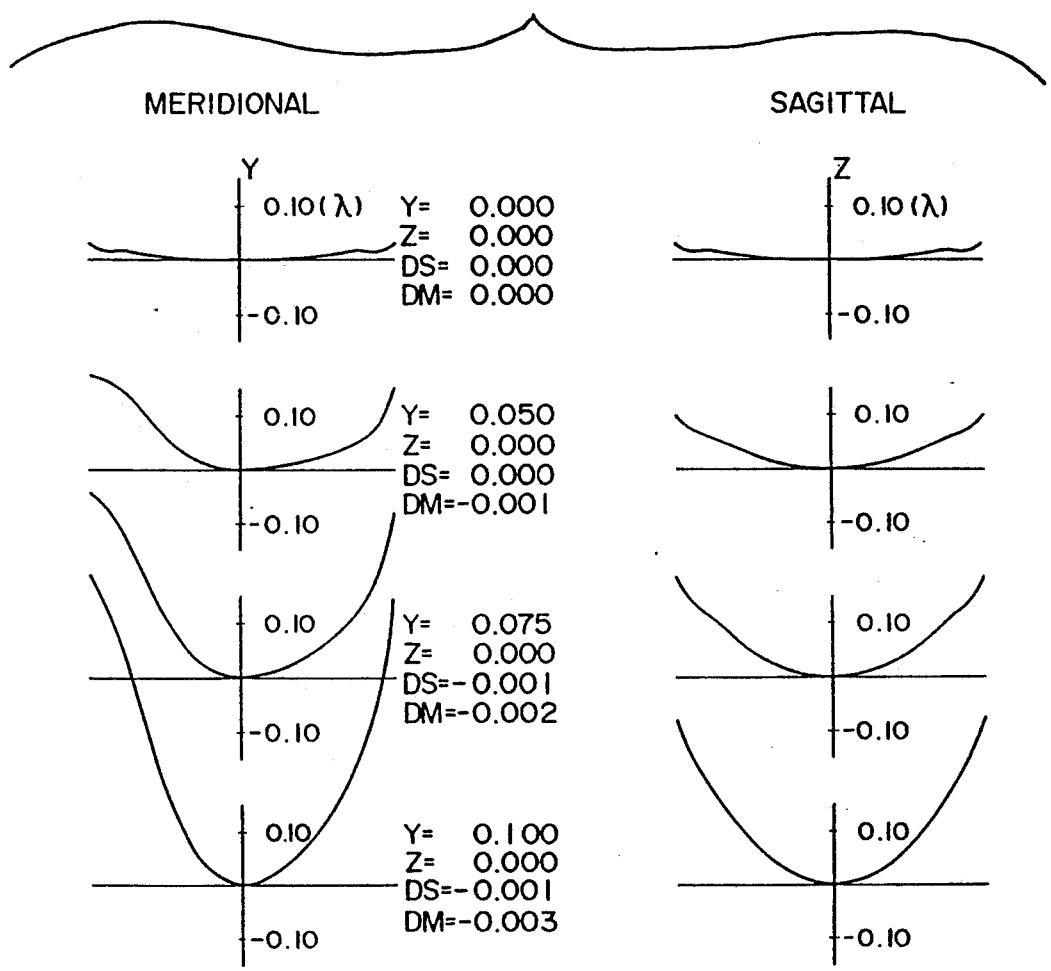
FIG. 39 are wave aberration diagrams by a single unit of the objective lens shown in FIG. 37.
Figure 40:
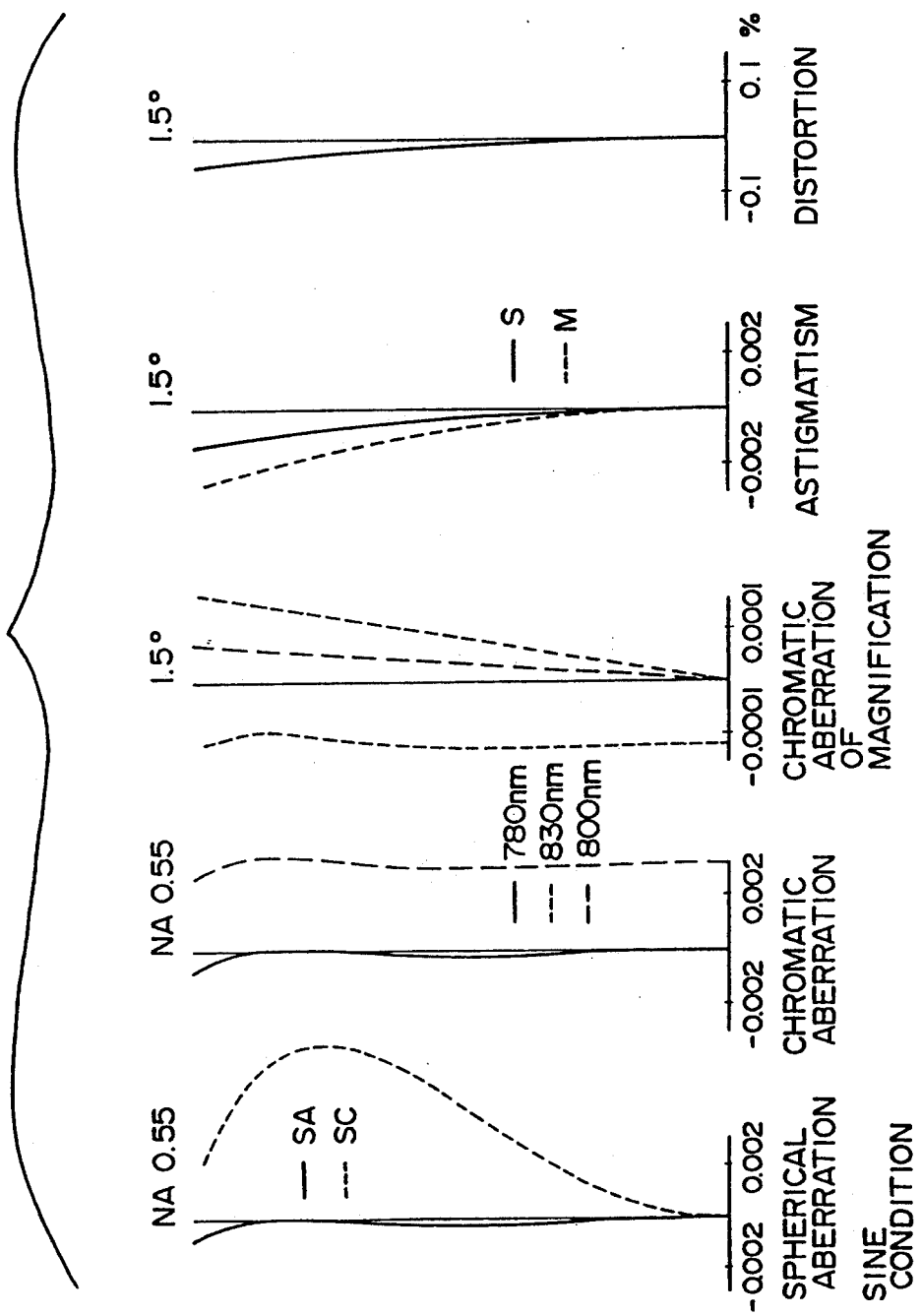
FIG. 40 are various aberration diagrams by a single unit of the objective lens shown in FIG. 37.
Figure 41:
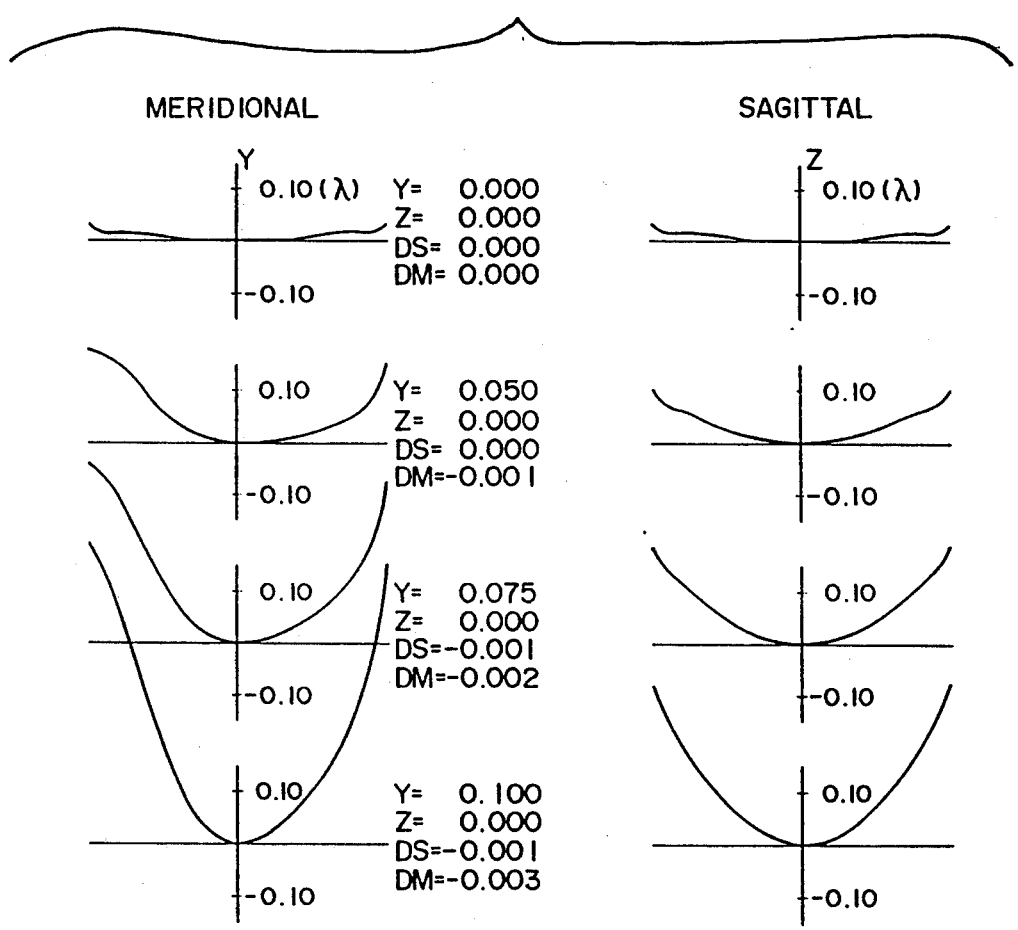
FIG. 41 are wave aberration diagrams by a single unit of the objective lens shown in FIG. 37.
Figure 42:
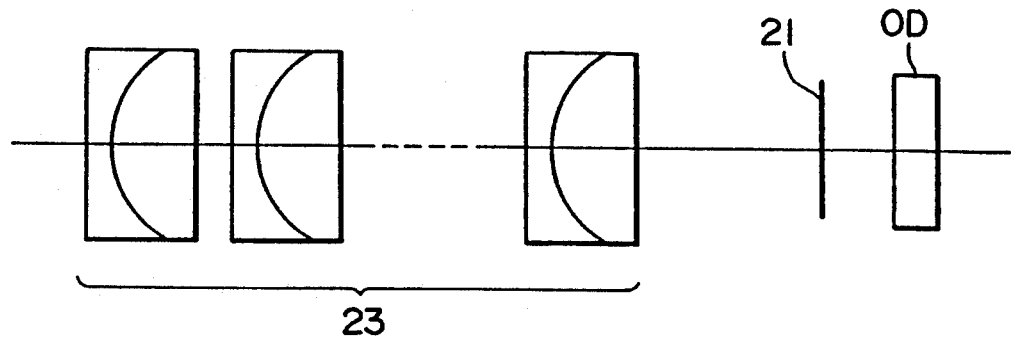
FIG. 42 is a lens diagram showing a first example of an objective optical system in which a hologram lens is used as an objective lens.
Figure 43:
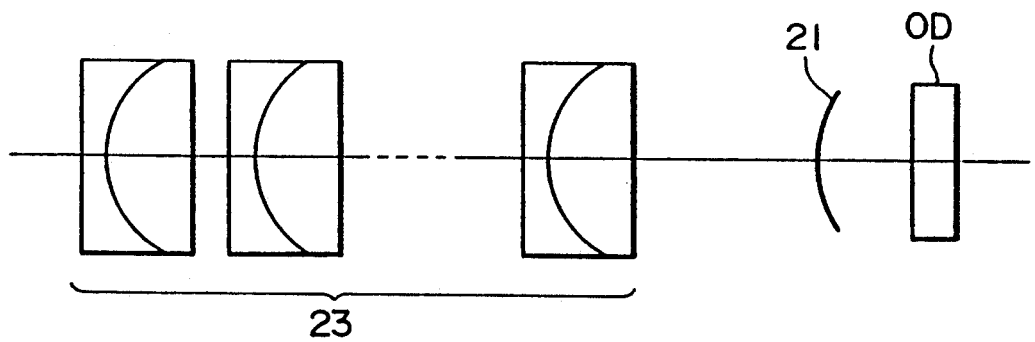
FIG. 43 is a lens diagram showing a second example of an objective optical system in which a hologram lens is used as an objective lens.

Various aberrations of this objective optical system are shown in FIG. 38 and the wave aberrations are shown in FIG. 39. Also, in order to determine affection given to the chromatic aberration correcting element, various aberrations and the wave aberrations by a single unit of the objective lens are shown in FIGS. 40 and 41. FIGS. 42 and 43 show examples wherein a hologram lens is used as the objective lens. As the hologram lens is a lens utilizing diffraction, a moving amount (chromatic aberration on the axis) CA of the light converged position with respect to the wavelength fluctuation can be expressed as follows;

$$CA = -f \cdot (\Delta\lambda/\lambda)$$

wherein the focal length is represented by f, the central wavelength to use by $\lambda$, and the wavelength fluctuation by $\Delta\lambda$. That is, the movement of the converged position with respect to the wavelength fluctuation of 1 nm at the wavelength of 780 nm becomes −f·(1/780) nm.

On the contrary, in the case of an ordinary lens utilizing refraction, as it becomes $CA = -f \cdot \{\Delta n/(-1+n)\}$, its value becomes f·(1/10000)~f·(1/25000).

Therefore, the generating amount of the chromatic aberration of the hologram lens is about 30 times of the lens utilizing refraction and the character (plus or minus) becomes inverted. Owing to the foregoing, in order to use the chromatic aberration correcting element in the above-mentioned respective embodiments in order to use the hologram lens, it is necessary to arrange about 30 pieces of chromatic aberration correcting element.

FIG. 42 shows a case where a plane hologram lens is used, while FIG. 43 shows a case where a curved hologram lens is used.

By the way, as the chromatic aberration correcting element of the above-mentioned EX.1 to EX. 9 is formed of a positive lens and a negative lens cemented together and both surfaces thereof are formed in a surface having no power. In this case, as the chromatic aberration correcting effect is exhibited only at the cemented surfaces, it is necessary that a difference of $\Delta n/\Delta \lambda$ between the positive and negative lenses is made large and the radius of curvature of the cemented surfaces is made small.

However, when the difference of $\Delta n/\Delta \lambda$ between the positive lens and the negative lens is large, the aberration at the peripheral portion becomes large, and when the radius of curvature of the cemented surfaces becomes small, the effective aperture becomes small in order to obtain the edge thickness and the diameter of the effective luminous flux becomes large. As a result, the effective aperture of the luminous flux becomes difficult to be obtained large.

When the generating amount of the aberration at the cemented surfaces is reviewed based on the S1 which is a coefficient of the ternary spherical aberration, it can be expressed as follows;

$$S1 = \Sigma \left\{ n_p^2 h \phi^2 \left( \frac{\beta_n}{n_n} - \frac{\beta_p}{n_p} \right) \right\}$$

wherein the refractive index of the lens on the light incident side is represented by $n_p$, the refractive index of the lens on the outgoing side by $n_n$, the radius of curvature of the cemented surfaces by $r_m$, the incident height of the paraxial ray of light by h, the inclination of the paraxial light of the lens on the light incident side by $\beta_p$, and the inclination of the paraxial light of the lens on the outgoing side by $\beta_n$.

However, from the following relations;

$$\phi = \frac{h}{r_m} - \beta_p,$$

$$\beta_n = \frac{1}{n_n} \cdot \left( \frac{n_n - n_p}{r_m} \cdot h + n_p \beta_p \right)$$

if $(\Delta n)^2 \to 0$ is given, it is guided to the following relation;

$$S1 \approx \Sigma \left\{ n_p^2 h \left( \frac{h}{r_m} - \beta_p \right)^2 \left( \frac{\Delta n_p h}{r_m n_n^2} - \frac{2\Delta n_p}{n_p^2} \beta_p \right) \right\}$$

and provided $\beta p \to 0$, $h \to 1$, it is further guided to the following relation;

$$S1 = \Sigma n_p^2 \cdot \left( \frac{1}{r_m} \right)^2 \left( \frac{\Delta n_p}{r_m n_n^2} \right)$$

$$= \Sigma \frac{\Delta n_p}{r_m^3}$$

From the above-mentioned relation, it can be understood that the spherical aberration amount is proportional to the third power of the curvature and is proportional to $\Delta n$.

On the other hand, as the chromatic aberration correcting effect depends on the number of surfaces having the curvature and the curvature, the chromatic aberration correcting surfaces are separated into two portions, and the radius of curvature of each surface is made twice in order to compare with the case where the chromatic aberration correcting surface is not separated. As a result, presuming that the chromatic aberration correcting amount is the same, the generating amount of the spherical aberration can be restrained to ¼.

Therefore, in the following EXAMPLES 10-12, the chromatic aberration correcting element is formed of three lenses cemented together and the chromatic aberration correcting surfaces are separated and disposed in two places.

Each end face of the chromatic aberration correcting element is formed in a surface having almost no power and constructed in such to generate only the chromatic aberration without having power.

According to such construction, when compared with a chromatic aberration correcting element which has only one cementing surface, the same amount of chromatic aberration correction can be achieved by ¼ spherical aberration generating amount. Therefore, when compared with the case where the cemented surface is only one, the allowable width of the value of $\Delta n$ is widened and therefore the width of selection of a combination of glass materials can be widened.

Furthermore, as the radius of curvature of the cemented surface is large, the edge thickness of the positive lens can be obtained even when the effective aperture is made large. If the effective aperture is large, even when the optical axis of the objective lens is brought out of the optical axis of the chromatic aberration correcting element, the possibility for occurring the eclipse of the luminous flux is small.

Although the above explanation was made based on the ternary aberration and the change of aberration which the ray of light near the optical axis has is found, the objective optical system having only one cemented surface, when taking into consideration the affection of the high order aberration, generates ten times or more of aberration with respect to the ray of light passing the peripheral portion of the chromatic aberration correcting element when compared with one having the cemented surface split into two portions.

By the way, at the time when the optical characteristic of the objective lens system is evaluated, it is necessary to take into consideration the affection of an adhesive used for cementing. An adhesive which is used for attaching optical parts such as ordinary lens, etc. has a refractive index of about 1.5~1.6. When the refractive index of a glass material to be cemented is different from the refractive index of the adhesive, a light refraction is occurred on that surface and an aberration is generated. As the aberration amount is proportional to the generating amount of the aberration on the front and rear surfaces of the adhesive layer, it is inversely proportional to the radius of curvature of the cemented surface and is proportional to the difference of the refractive index between the glass material and the adhesive.

The difference of the refractive index between the adhesive and the glass material becomes 0.1 or more because no adhesive of a high refractive index is available at present and no combination of glass materials having a large difference of $\Delta n/\Delta \lambda$ at a low refractive index.

Figure 44:
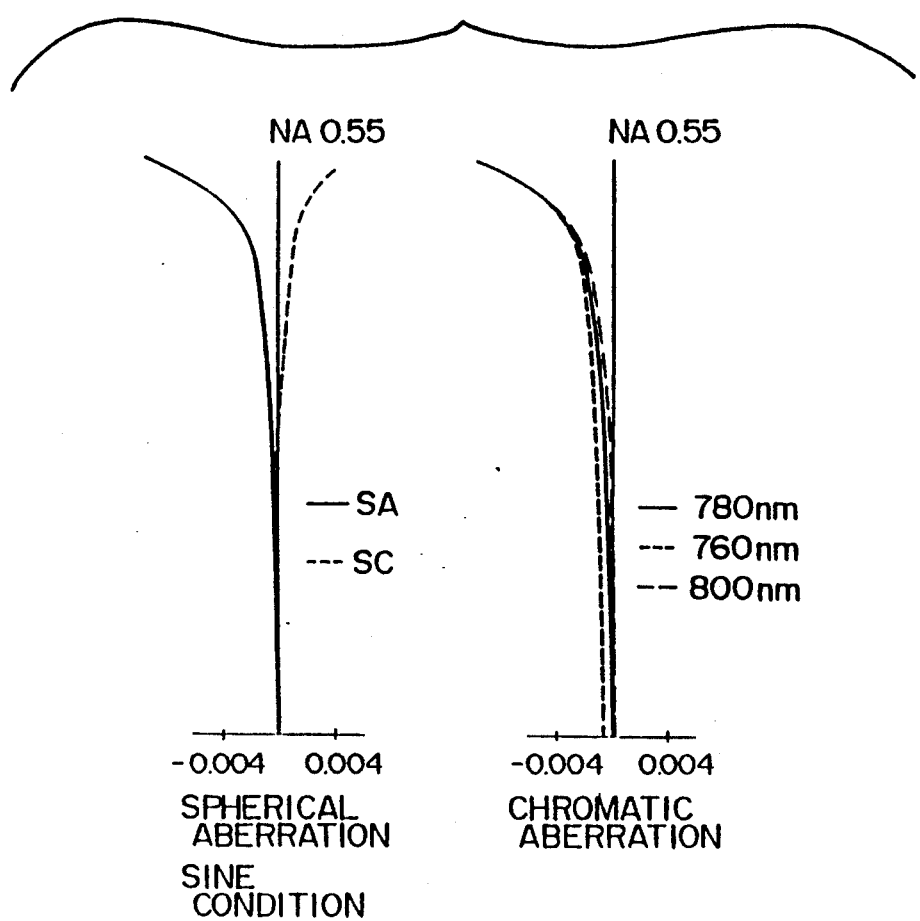
FIG. 44 are various aberration diagrams in a case where affection by an adhesive of the objective optical system of EXAMPLE 1 is taken into consideration.

For example, when an adhesive layer having a refractive index of 1.54000 and a thickness of 0.01 mm on the cementing surface of the chromatic aberration correcting element of EXAMPLE 1, each aberration is varied as shown in FIG. 44. When the thickness of the adhesive layer is 0, the aberrations generated on the front and rear surface of the adhesive layer are offset. However, when the adhesive layer is thick, the incident height of light between the front and rear surfaces is varied and the aberrations on the front and rear surfaces of the adhesive are not completely offset. As a result, the aberration is generated and a problem arises.

As the chromatic aberration correcting element of EXAMPLE 1 has only one cemented surface, it is indispensable to make the radius of curvature of the cemented surface small in order to correct the chromatic aberration. Therefore, when there is a difference between the refractive index of the adhesive and the refractive index of the glass material, the degree for generating the aberration with respect to the change of thickness of the adhesive layer is large. By comparing with FIG. 10 in which the affection by the adhesive is not taken into consideration, there can be recognized deterioration of efficiency on the peripheral portion.

When the cemented surface is split into two portions here, the chromatic aberration can be sufficiently corrected without making the radius of curvature small, and the aberration fluctuation on each cemented surface with respect to the change of thickness of the adhesive layer is small. Also, by making the two cemented surfaces into generally symmetrical shapes, the deterioration of efficiency can be restrained even when the thickness of the adhesive layer is irregular.

When the chromatic aberration correcting element is formed of three lenses or more cemented together, it is desirous to satisfy the conditions of the following relations (8) (9).

$$\left| \left\{ \left( \frac{\Delta n_1}{\Delta \lambda} + \frac{\Delta n_3}{\Delta \lambda} \right)/2 - \frac{\Delta n_2}{\Delta \lambda} \right) \right\} \cdot \lambda^2 \right| > 9.0 \text{ nm} \quad (8)$$

$$-1.25 < r_3/r_2 < -0.8 \quad (9)$$

In the above relations, the symbolic characters have the following meanings.

$\Delta n_i/\Delta \lambda$: gradient of change with respect to the wavelength of the ith lens $r_2$: radius of curvature of the cemented surfaces of the first and second lenses $r_3$: radius of curvature of the cemented surface of the second lens and the third lens.

The relation (8) shows a relation similar to the relation (3) applied to the lens formed of three lenses.

When escaped from the range of this relation, even if the curvature of the cemented surface is strengthened to correct the chromatic aberration, the change in degree of convergence or divergence on the cemented surface becomes excessively large when change in wavelength is generated. As a consequence, since the spherical aberration of high order of the element itself becomes large, it becomes impossible that a sufficient correction of the chromatic aberration is compatible with the prevention of other aberration deterioration.

The relation (9) shows the conditions for making the two cementing surfaces into generally symmetrical shape.

As described previously, the aberration amount generating on the cemented surface is proportional to the generating amount of aberration on the front and rear surfaces of the adhesive layer. Therefore, it is desirous that the burden of the chromatic aberration is equalized and the curvature of the both surfaces is made gentle. When the conditions of the relation (9) are not satisfied, the effect for splitting the chromatic aberration correcting surface is small, and when the conditions are satisfied, the glass material can be made small in the generating amount of aberration on the interface with respect to the adhesive layer by satisfying the conditions.

Therefore, even if there is a small amount of irregularity in thickness of the adhesive layer at the time when the surface is cemented, deterioration of efficiency can be restrained. When the condition of $r_2 = -r_3$ is satisfied, generation of the aberration becomes minimum.

EXAMPLE 10

Figure 45:
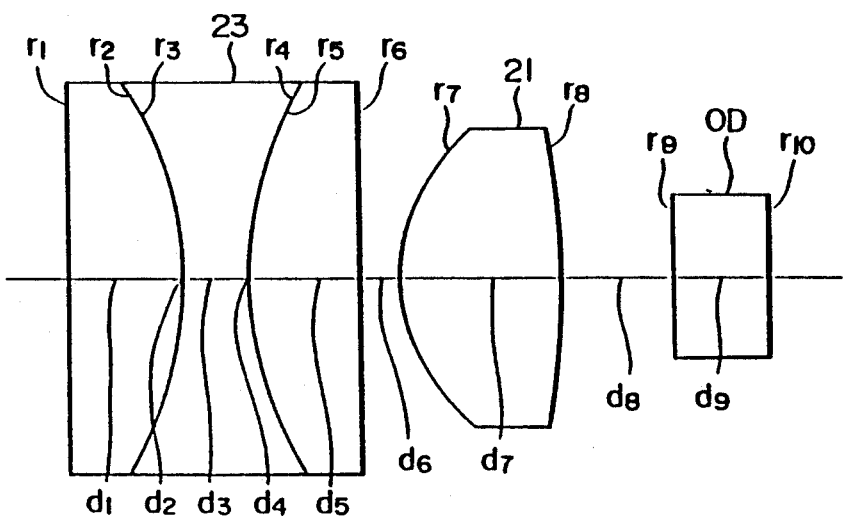
FIG. 45 is a lens diagram showing EXAMPLE 10 of the objective optical system.
Figure 46:
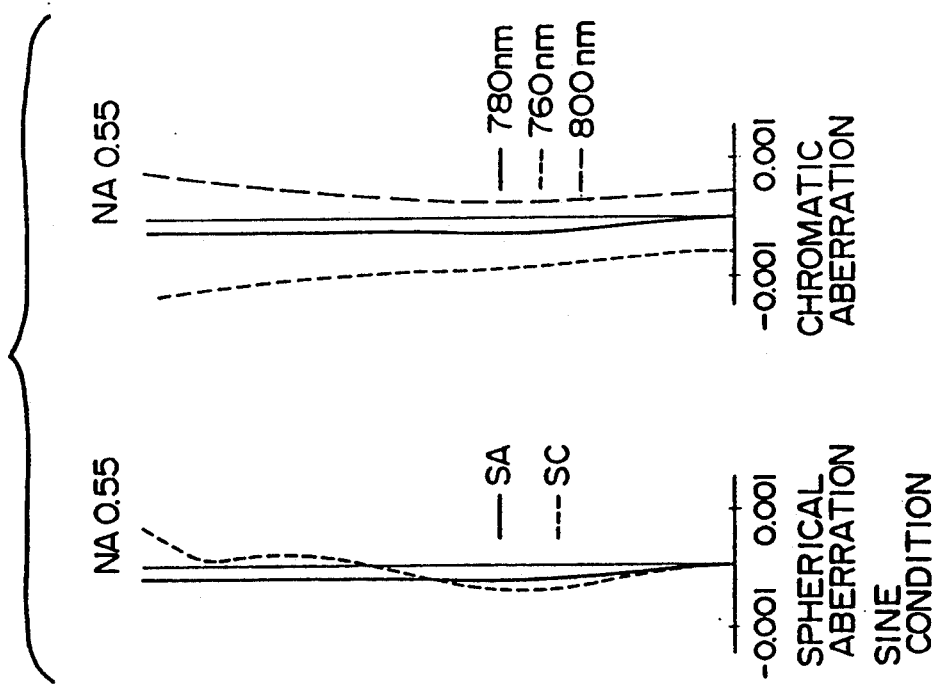
FIG. 46 are various aberration diagrams in a case where affection by an adhesive by the objective optical system shown in FIG. 45.

FIG. 45 shows EXAMPLE 10 of an objective optical system according to the present invention, and concrete numerical value construction is shown in TABLE 15, and the aberration by this construction is shown in FIG. 46. In this EXAMPLE 10, as the thickness of the adhesive layer is also taken into consideration, a surface number is put for each lens regarding the cemented surface. As the numerical value constructions for the objective lens and the cover glass of the optical disk is the same to that of EXAMPLE 1, description will be omitted in the following Table.

TABLE 15

| surface NO. | r | d | $n_{780}$ | $n_d$ | $\nu_{780}$ | glass material |
|---|---|---|---|---|---|---|
| 1 | ∞ | 1.400 | 1.72437 | 1.73400 | 1071 | LaK09 |
| 2 | −4.400 | 0.010 | 1.54000 | | | adhesive |
| 3 | −4.400 | 0.800 | 1.72421 | 1.74077 | 684 | SF13 |
| 4 | 4.400 | 0.010 | 1.54000 | | | adhesive |
| 5 | 4.400 | 1.400 | 1.72437 | 1.73400 | 1071 | LaK09 |
| 6 | ∞ | 0.500 | | | | |

NA 0.55  f = 3.30  ω = 1.7°

Figure 47:
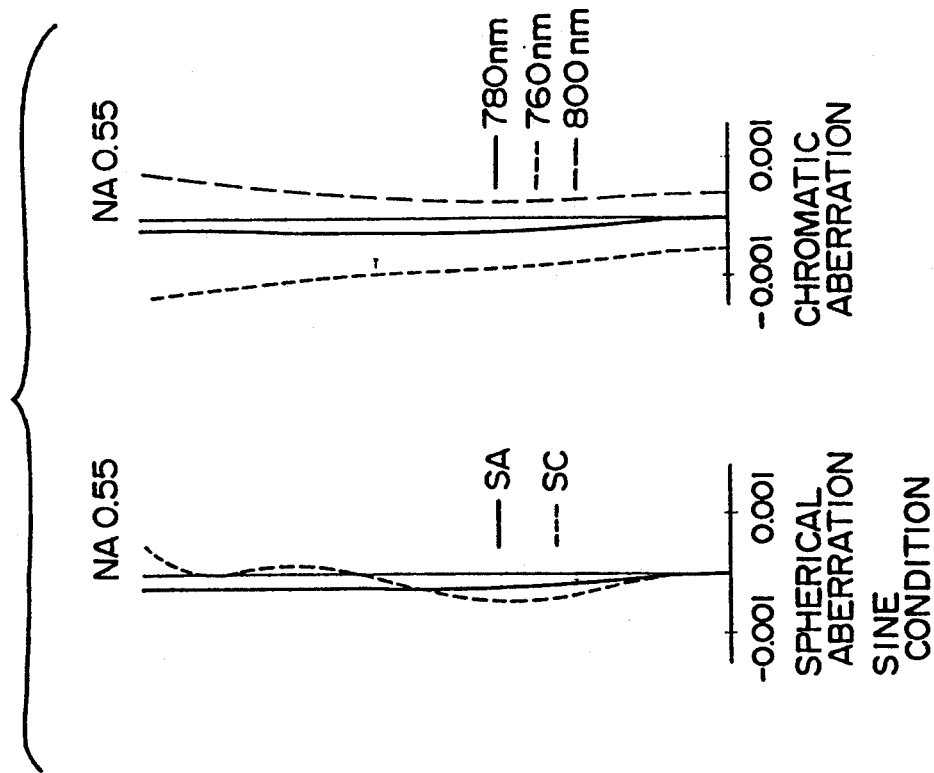
FIG. 47 are various aberration diagrams wherein an adhesive is not taken into consideration.

FIG. 47 shows the aberration in a case where the adhesive layer is not provided. From FIGS. 46 and 47, it will be understood that the various aberrations are hardly changed depending on whether the adhesive layer is provided.

EXAMPLE 11

Figure 48:
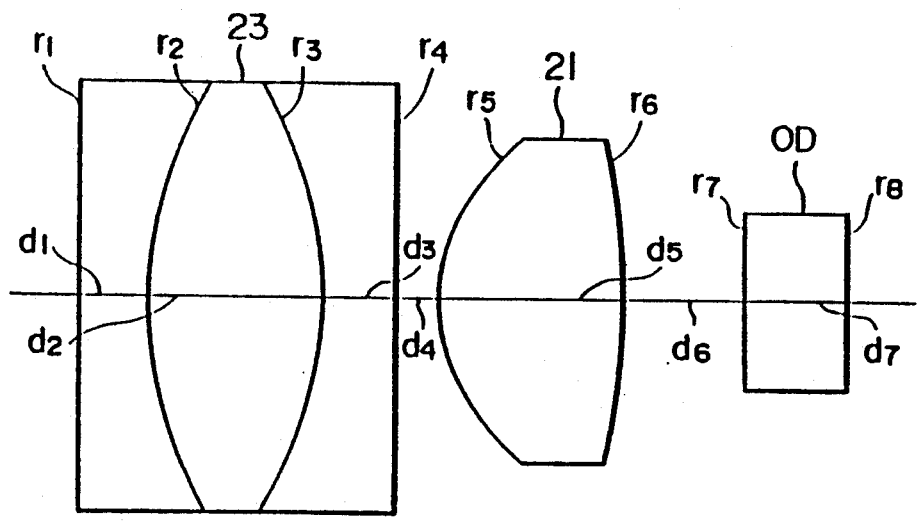
FIG. 48 is a lens diagram showing EXAMPLE 11 of an objective optical system.
Figure 49:
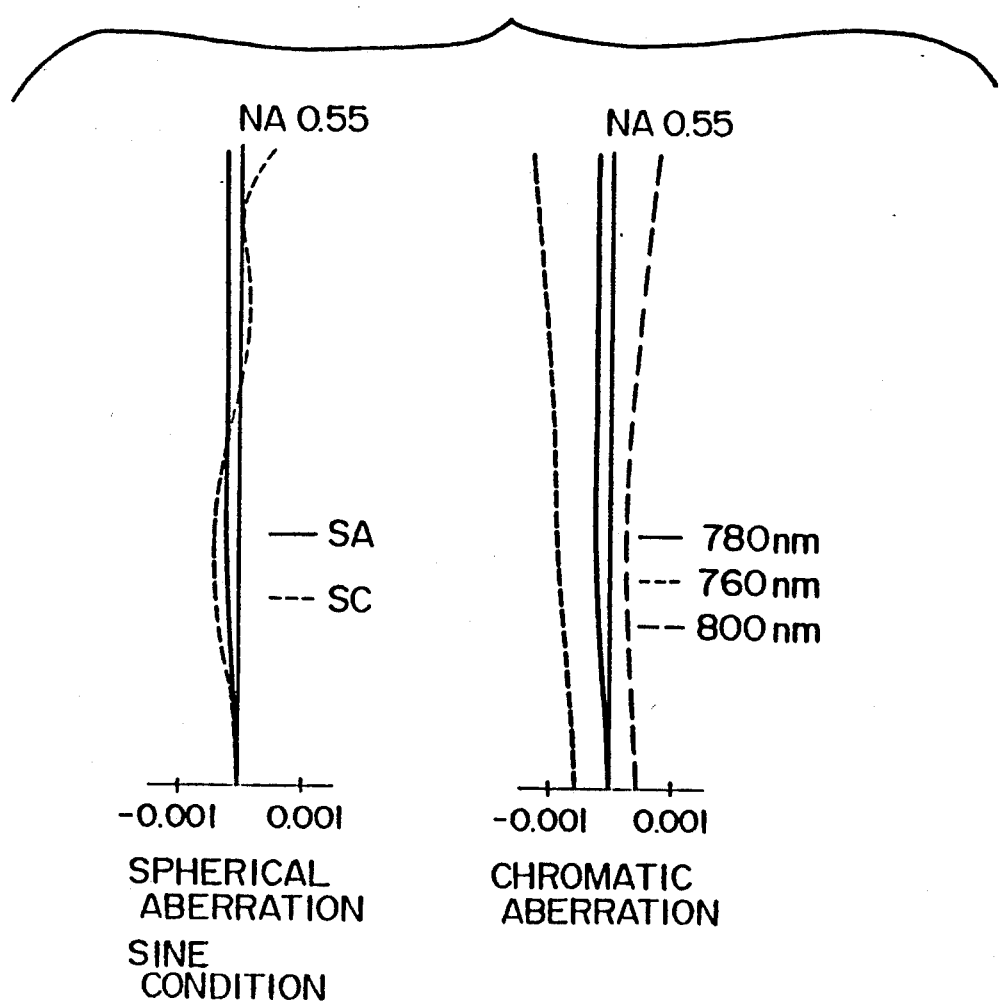
FIG. 49 are aberration diagrams showing various aberration diagrams after taking into consideration of the objective optical system shown in FIG. 48.

FIG. 48 shows EXAMPLE 11 of an objective optical system and the concrete construction of numerical values thereof is as shown in TABLE 16. FIG. 49 shows the aberration when the affection of the adhesive according to this construction is taken into consideration.

TABLE 16

| surface NO. | r | d | $n_{780}$ | $n_d$ | $\nu_{780}$ | glass material |
|---|---|---|---|---|---|---|
| 1 | ∞ | 0.800 | 1.72421 | 1.74077 | 684 | SF13 |
| 2 | 4.400 | 2.000 | 1.72437 | 1.73400 | 1071 | LaK09 |
| 3 | −4.400 | 0.800 | 1.72421 | 1.74077 | 684 | SF13 |
| 4 | ∞ | 0.500 | | | | |

NA 0.55  f = 3.30  ω = 1.7°

EXAMPLE 12

Figure 50:
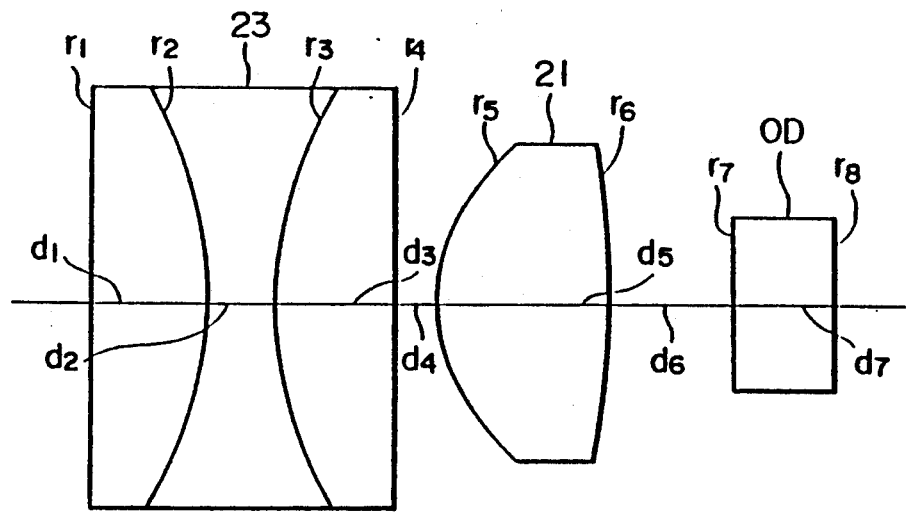
FIG. 50 is a lens diagram showing EXAMPLE 12 of the objective optical system.
Figure 51:
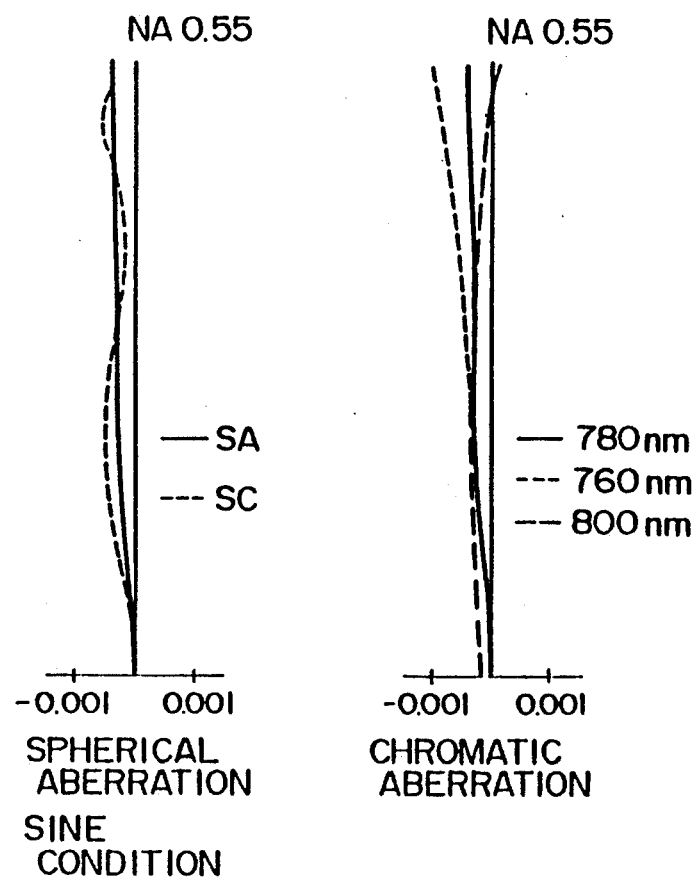
FIG. 51 are various aberration diagrams taking into consideration the affection by an adhesive of the objective optical system shown in FIG. 50.
Figure 52:
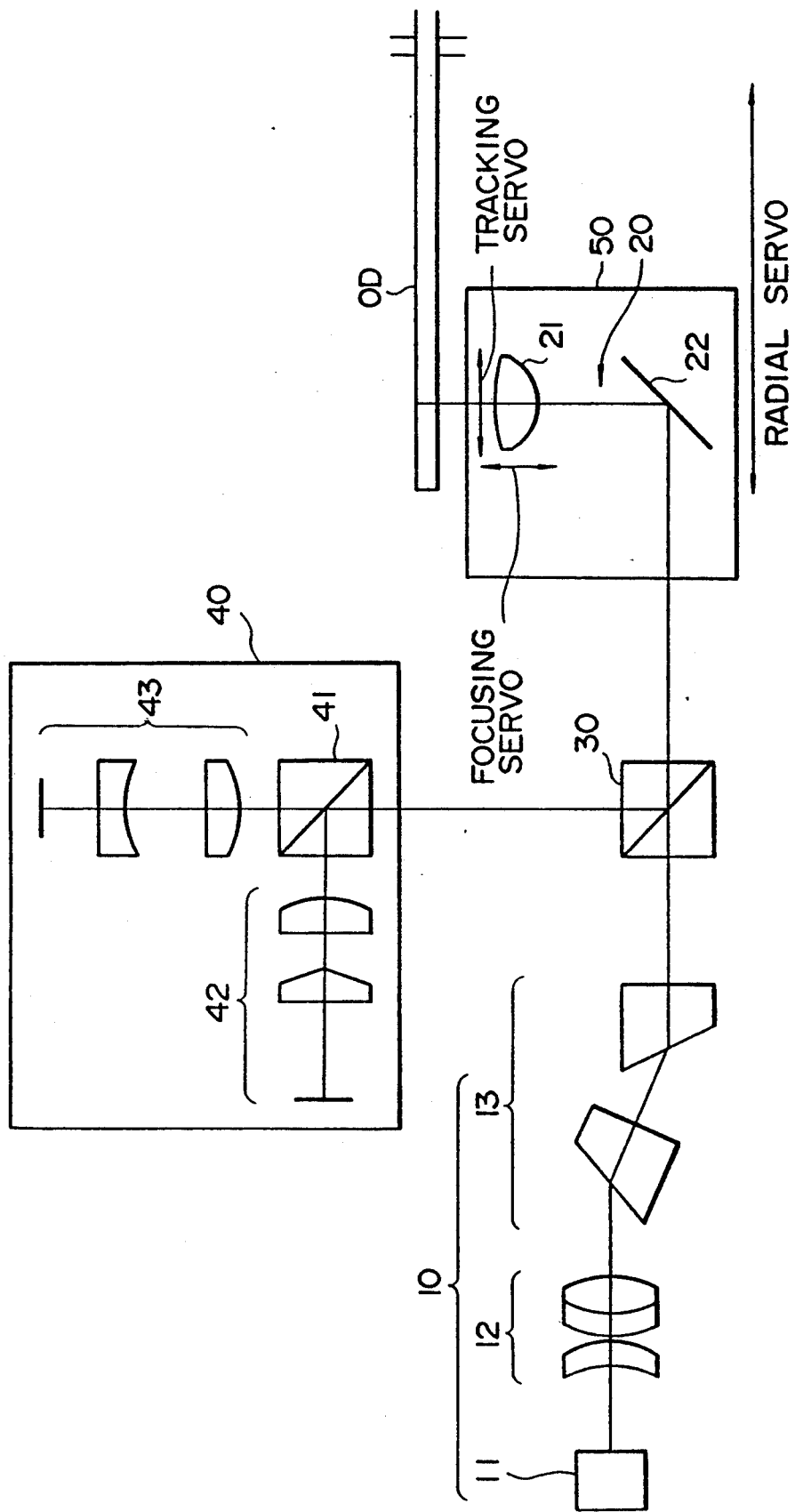
FIG. 52 is a light path diagram showing an optical system of the conventional optical information recording/reproducing apparatus.

FIG. 50 shows EXAMPLE 12 of an objective optical system and the concrete construction of numerical values thereof is as shown in TABLE 17. FIG. 51 shows the aberration when the affection of the adhesive according to this construction is taken into consideration.

TABLE 17

NA 0.55   f = 3.30   ω = 1.7°

| surface NO. | r | d | $n_{780}$ | $n_d$ | $v_{780}$ | glass material |
|---|---|---|---|---|---|---|
| 1 | ∞ | 1.400 | 1.73145 | 1.74100 | 1076 | LaK011 |
| 2 | −4.400 | 0.800 | 1.73166 | 1.75000 | 621 | SFS53 |
| 3 | 4.400 | 1.400 | 1.73156 | 1.74100 | 1076 | LaK011 |
| 4 | ∞ | 0.500 | | | | |

In the above-mentioned respective embodiments, assuming that the central wavelength in use is 780 nm, the construction has a satisfactory efficiency at this wavelength. However, the application of the present invention is not limited to the above-mentioned wavelength but it can also be applied to other wavelength ranges. Examples of a combination of glass materials satisfying the above-mentioned conditions of the present invention in wavelengths having a central wavelength in use of other than about 780 nm are as follows;

In the following relation, $n_p$ represents the refractive index of a positive lens, $n_n$ the refractive index of a negative lens, and $\Delta n/\Delta \lambda$ the gradient of a change with respect to the wavelength of the refractive index of each glass material.

---

<wavelength of 830 nm>
positive lens LaSK02 (Ohara)
$n_{830} = 1.77419$    $\Delta n/\Delta \lambda = -3.3 \times 10^{-5}$ nm$^{-1}$
$n_d = 1.78650$    $v_d = 50.0$
negative lens SFS54 (Minolta)
$n_{830} = 1.77372$    $\Delta n/\Delta \lambda = -6.0 \times 10^{-5}$ nm$^{-1}$
$n_d = 1.79850$    $v_d = 22.6$
$n_p - n_n = 47 \times 10^{-5}$
$(\Delta n_p/\Delta \lambda - \Delta n_n/\Delta \lambda) \times \lambda^2 = 18.8$ nm $n_{830}$: refractive index in the wavelength of 830 nm <wavelength of 670 nm>
positive lens LaF04 (Ohara)
$n_{670} = 1.75145$    $\Delta n/\Delta \lambda = -5.6 \times 10^{-5}$ nm$^{-1}$
$n_d = 1.75700$    $\lambda_d = 47.8$
negative lens SFL14 (Ohara)
$n_{670} = 1.75224$    $\Delta n/\Delta \lambda = -9.4 \times 10^{-5}$ nm$^{-1}$
$n_d = 1.76182$    $\lambda_d = 26.5$
$n_p - n_n = 79 \times 10^{-5}$
$(\Delta n_p/\Delta \lambda - \Delta n_n/\Delta \lambda) \times \lambda^2 = 17.0$ nm $n_{670}$: refractive index in the wavelength of 670 nm <wavelength of 632 nm>
positive lens LaSK01 (Ohara)
$n_{532} = 1.75979$    $\Delta n/\Delta \lambda = -10.0 \times 10^{-5}$ nm$^{-1}$
$n_d = 1.75500$    $v_d = 52.3$
negative lens SFS53 (Minolta)
$n_{532} = 1.75986$    $\Delta n/\Delta \lambda = -21.1 \times 10^{-5}$ nm$^{-1}$
$n_d = 1.75000$    $v_d = 25.1$
$n_p - n_n = -7 \times 10^{-5}$
$(\Delta n_p/\Delta \lambda - \Delta n_n/\Delta \lambda) \times \lambda^2 = 31.3$ nm $n_{532}$: refractive index in the wavelength of 532 nm

---

Next, the relation between each embodiment and each conditional relation will be shown in the following TABLE 18.

TABLE 18

| | (1) | (2) | (3) | (4) | (5) | (6) | (7) | (8) |
|---|---|---|---|---|---|---|---|---|
| EX. 1 | 16.6 | 0.262 | 12.5 | 0.00023 | ∞ | ∞ | ∞ | — |
| EX. 2 | 16.6 | 0.262 | 12.5 | 0.00023 | ∞ | ∞ | ∞ | — |
| EX. 3 | 0.6 | 0.230 | 10.1 | 0.00084 | ∞ | ∞ | ∞ | — |
| EX. 4 | 289 | 0.302 | 16.5 | 0.00352 | ∞ | ∞ | ∞ | — |
| EX. 5 | 289 | 0.302 | 16.5 | 0.00352 | ∞ | ∞ | ∞ | — |
| EX. 6 | 289 | 0.302 | 16.5 | 0.00352 | ∞ | ∞ | ∞ | — |
| EX. 7 | 140 | 0.250 | 12.8 | 0.00178 | ∞ | ∞ | ∞ | — |
| EX. 8 | 289 | 0.302 | 16.5 | 0.00246 | 17.7 | 15.2 | 15.2 | — |
| EX. 9 | 0.6 | 0.230 | 10.1 | 0.00084 | ∞ | ∞ | ∞ | — |
| EX. 10 | 16.6 | 0.262 | 12.5 | 0.00044 | ∞ | ∞ | ∞ | −1.0 |
| EX. 11 | 16.6 | 0.262 | 12.5 | 0.00024 | ∞ | ∞ | ∞ | −1.0 |
| EX. 12 | 21.0 | 0.309 | 16.0 | 0.00057 | ∞ | ∞ | ∞ | −1.0 |

By the way, above-mentioned optical systems are designed for reducing effects of chromatic aberration. However, it is possible to design an objective optical system which is used the changing of the converging point due to the chromatic aberration positively. Standing this view point, the change of the converging point is able to use for focusing servo instead of actuating an objective lens.

As change the wevelength of light from light source, converging point is change. Therefor, when the out of focus is detected, light sorce driver controls wevelength of light as such that amount of out of focus is offsetted by amount of change of converging point.

Particularly, when the objective optical system is designed as such that a relation between the changing amount of converging point and the shift of wavelength is liner, control of wevelength is easy.

What is claimed is:

1. An optical system of an optical information recording/reproducing apparatus including:
   a light source for emitting divergent luminous flux;
   a collimator lens for collimating the luminous flux emitted from said light source;
   an objective lens for converging the luminous flux emitted from said light source onto a medium;
   a beam splitter for splitting the luminous flux reflected by said medium from a light path directed to the light source and guiding the luminous flux to a light receiving system;
   a chromatic aberration correcting element having substantially no power disposed between said objective lens and said beam splitter and adapted to correct a chromatic aberration of said objective lens; and
   means for independently actuating said objective lens at least in an optical axis direction defined by said objective lens;
   said chromatic aberration correcting element comprising a positive lens and a negative lens cemented together, each end face of said chromatic aberration correcting element being formed with a generally planar surface.

2. An optical system of an optical information recording/reproducing apparatus of claim 1, wherein said actuating means independently actuates said objective lens in said optical axis direction and in the vertical direction with respect to said optical axis.

3. An optical system of an optical information recording/reproducing apparatus of claim 1, which further includes a head moved with respect to said medium, and in which said objective lens and said chromatic aberration correcting element are disposed on said head.

4. An optical system of an optical information recording/reproducing apparatus of claim 3, wherein said actuating means independently actuates said objective lens in said optical axis direction and in the vertical direction with respect to said optical axis.

5. An optical system of an optical information recording/reproducing apparatus of claim 1, which further includes a head moved with respect to said medium and in which said objective lens is disposed on said head and said chromatic aberration correcting element is disposed outside said head.

6. An optical system of an optical information recording/reproducing apparatus of claim 5, wherein said actuating means independently actuates said objective lens in said optical axis and in the vertical direction with respect to said optical axis.

7. An optical system of an optical information recording/reproducing apparatus of claim 1, which further includes a head moved with respect to said medium and in which said light source portion, said objective lens, said chromatic aberration correcting element, said light receiving system and said beam splitter are disposed within said head.

8. An optical system of an optical information recording/reproducing apparatus of claim 7 wherein said actuating means independently actuates said objective lens in said optical axis and in the vertical direction with respect to said optical axis.

9. An optical system of an optical information recording/reproducing apparatus of claim 1, wherein said objective lens and said chromatic aberration correcting element are independently corrected in aberrations other than the chromatic aberration.

10. The optical system of an optical information recording/reproducing apparatus according to claim 1, said chromatic aberration correcting element being movable independently of said collimator lens.

11. An optical system of an optical information recording/reproducing apparatus according to claim 1, said chromatic aberration correcting element satisfying the following relation:

$$|n_p - n_n| \times 10^5 < 300$$

where
  $n_p$ is the refractive index of a positive lens in a center of a wavelength used; and
  $n_n$ is the refractive index of a negative lens in a center of a wavelength used.

12. An objective optical system of an optical information recording/reproducing apparatus including:
  an objective lens for converging a generally parallel luminous flux;
  a chromatic aberration correcting element having substantially no power for correcting a chromatic aberration of said objective lens; and
  means for independently actuating said objective lens at least in an optical axis direction defined by said objective lens;
  said chromatic aberration correcting element being formed of a positive lens and a negative lens cemented together, each end face of said chromatic aberration correcting element being formed as a generally planar surface.

13. An objective optical system of an optical information recording/reproducing apparatus of claim 12, wherein said actuating means independently actuates said objective lens in the optical axis direction and in the vertical direction with respect to said optical axis.

14. An objective optical system of an optical information recording/reproducing apparatus of claim 12, wherein said objective lens and said chromatic aberration correcting element are independently corrected in aberrations other than the chromatic aberration.

15. The objective optical system of an optical information recording/reproducing apparatus according to claim 12, further comprising a head movable with respect to a medium, said objective lens and said chromatic aberration correcting element being disposed on said head.

16. The optical system of an optical information recording/reproducing apparatus according to claim 12, said chromatic aberration correcting element satisfying the following relation:

$$|n_p - n_n| \times 10^5 < 300$$

where
  $n_p$ is the refractive index of a positive lens in a center of a wavelength used; and
  $n_n$ is the refractive index of a negative lens in a center of a wavelength used.

* * * * *